US012489858B2

(12) United States Patent
Hassan et al.

(10) Patent No.: US 12,489,858 B2
(45) Date of Patent: Dec. 2, 2025

(54) CUSTOMIZATION OF A USER INTERFACE DISPLAYING A RENDERING OF MULTIPLE PARTICIPANTS OF A HYBRID COMMUNICATION SESSION

(71) Applicant: MICROSOFT TECHNOLOGY LICENSING, LLC, Redmond, WA (US)

(72) Inventors: Amer Aref Hassan, Kirkland, WA (US); Mahendra D. Sekaran, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 279 days.

(21) Appl. No.: 17/835,918

(22) Filed: Jun. 8, 2022

(65) Prior Publication Data

US 2023/0403367 A1      Dec. 14, 2023

(51) Int. Cl.
*G06V 40/10*     (2022.01)
*G06F 3/04845*   (2022.01)
*H04L 65/403*    (2022.01)
*H04N 5/262*     (2006.01)
*G06F 3/04842*   (2022.01)

(52) U.S. Cl.
CPC ....... *H04N 5/2628* (2013.01); *G06F 3/04845* (2013.01); *G06V 40/10* (2022.01); *H04L 65/403* (2013.01); *H04N 5/2624* (2013.01); *G06F 3/04842* (2013.01)

(58) Field of Classification Search
CPC .... H04N 5/2628; H04N 5/2624; G06V 40/10; G06F 3/04845; H04L 65/403
See application file for complete search history.

(56) References Cited

U.S. PATENT DOCUMENTS 8,542,266 B2    9/2013  Leviav et al.
9,154,737 B2    10/2015 Thomas
(Continued)

OTHER PUBLICATIONS

"International Search Report and Written Opinion Issued in PCT Application No. PCT/US23/018791", Mailed Date: Aug. 9, 2023, 17 Pages.

(Continued)

*Primary Examiner* — Olisa Anwah
(74) *Attorney, Agent, or Firm* — Scott Y. Shigeta; Newport IP, LLC

(57) ABSTRACT

Systems for customizing user interfaces displaying an image of multiple participants of a communication session are disclosed. A system allows a user to make one or more selections of attendees from a video stream that includes multiple attendees, such as video captured by a conference room camera. In response to the selection, the system generates new video streams or images for each of the selected attendee(s) by extracting images of the selected attendee(s) from the video stream of the conference room camera. The system displays additional renderings for the new video streams or images to accompany the rendering of the video stream of the conference room camera. By allowing users to generate additional renderings of people from images that are initially displayed in a group video, the system can allow viewers to control the display of details of each person that may not be observable from the initial group image.

17 Claims, 26 Drawing Sheets

(56) References Cited

U.S. PATENT DOCUMENTS

| | | | |
|---|---|---|---|
| 10,148,913 B2 | 12/2018 | Nimri et al. | |
| 11,343,293 B1* | 5/2022 | Slotznick | H04N 5/272 |
| 2007/0279483 A1 | 12/2007 | Beers et al. | |
| 2011/0285809 A1 | 11/2011 | Feng et al. | |
| 2016/0359941 A1 | 12/2016 | Kvaal et al. | |
| 2018/0270428 A1 | 9/2018 | Nose et al. | |
| 2019/0222892 A1* | 7/2019 | Faulkner | H04N 21/4314 |
| 2020/0344278 A1* | 10/2020 | Mackell | H04N 7/15 |
| 2020/0371673 A1* | 11/2020 | Faulkner | G06F 3/017 |
| 2021/0176444 A1* | 6/2021 | Liu | H04N 7/157 |
| 2022/0374136 A1* | 11/2022 | Chang | G06F 3/04845 |
| 2024/0064271 A1* | 2/2024 | Murata | H04N 7/152 |

OTHER PUBLICATIONS

Citron, et al., "Boosting Communication and Collaboration for Teams of all Sizes in Google Workspace", Retrieved from: https://cloud.google.com/blog/products/workspace/announcing-new-features-in-google-workspace-for-hybrid-work, Mar. 31, 2022, 8 Pages.

Lee, Cynthia, "All You Need to Know About Smart Gallery and Why It's Changing Hybrid Meetings", Retrieved from: https://blog.zoom.us/all-you-need-to-know-about-smart-gallery/, Dec. 8, 2021, 5 Pages.

Perk, Niki Van Der, "Poly & Zoom Smart Gallery", Retrieved from: https://www.youtube.com/watch?v=IBBVY11eM6M, Jul. 27, 2021, 2 Pages.

\* cited by examiner

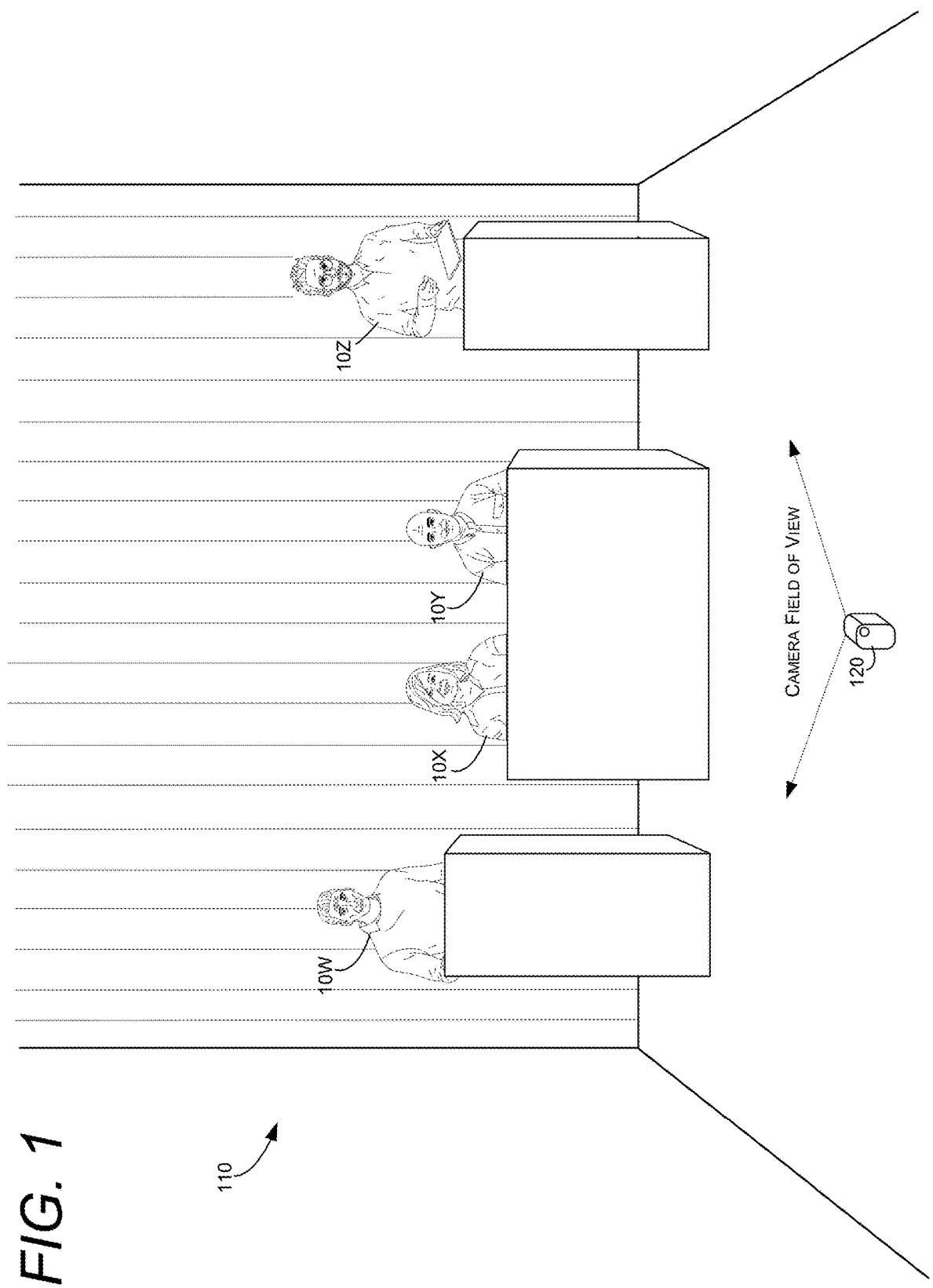

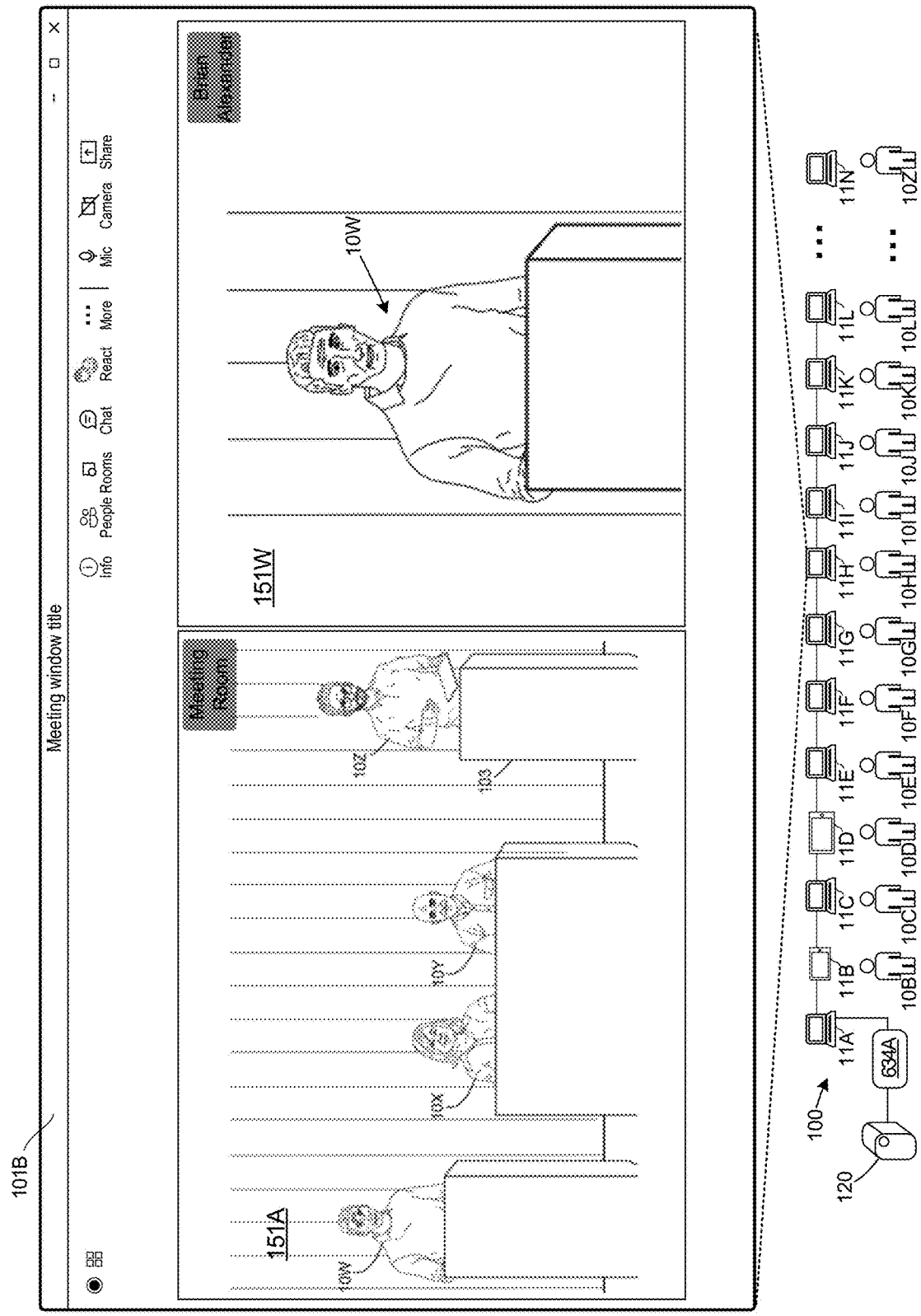

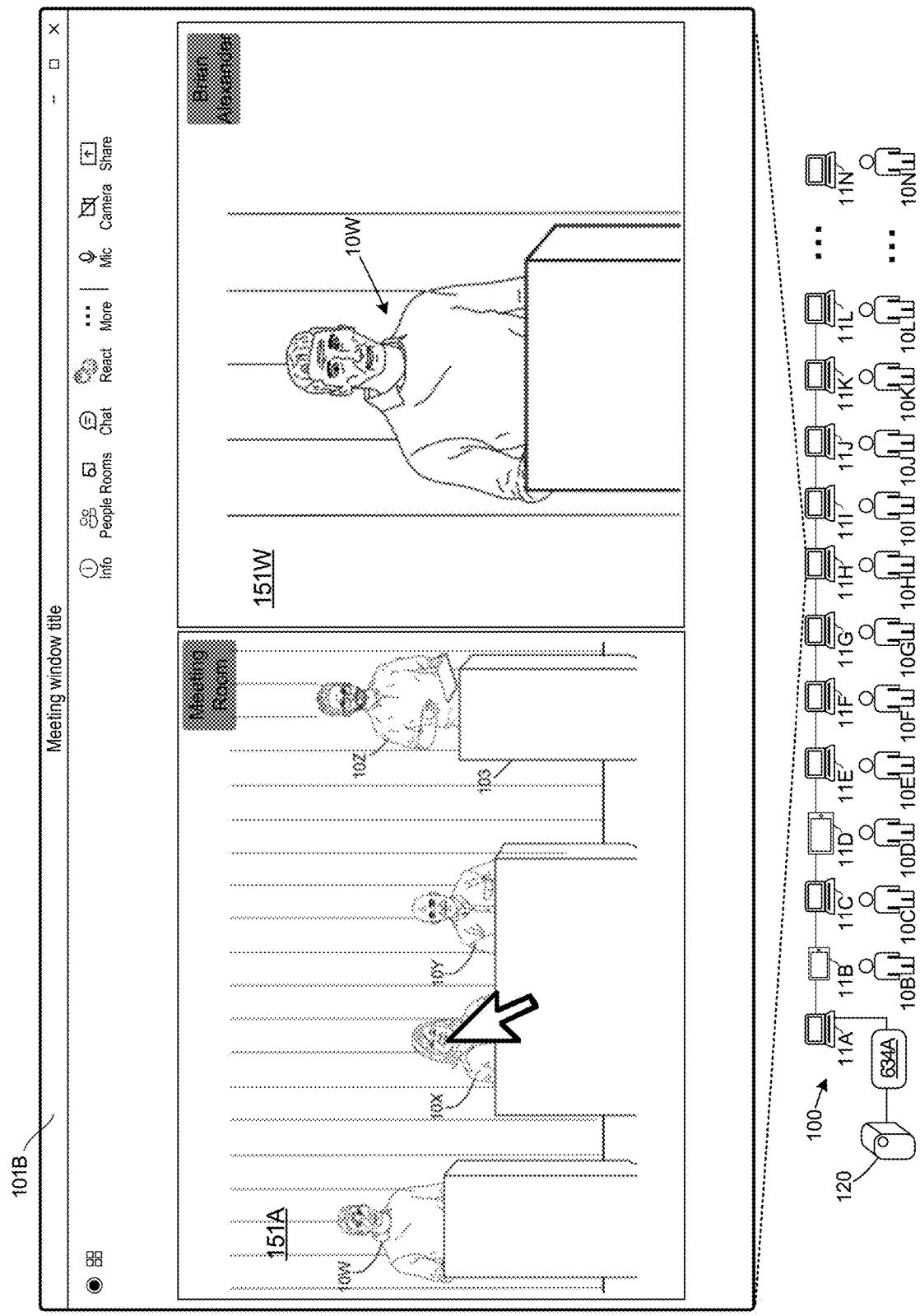

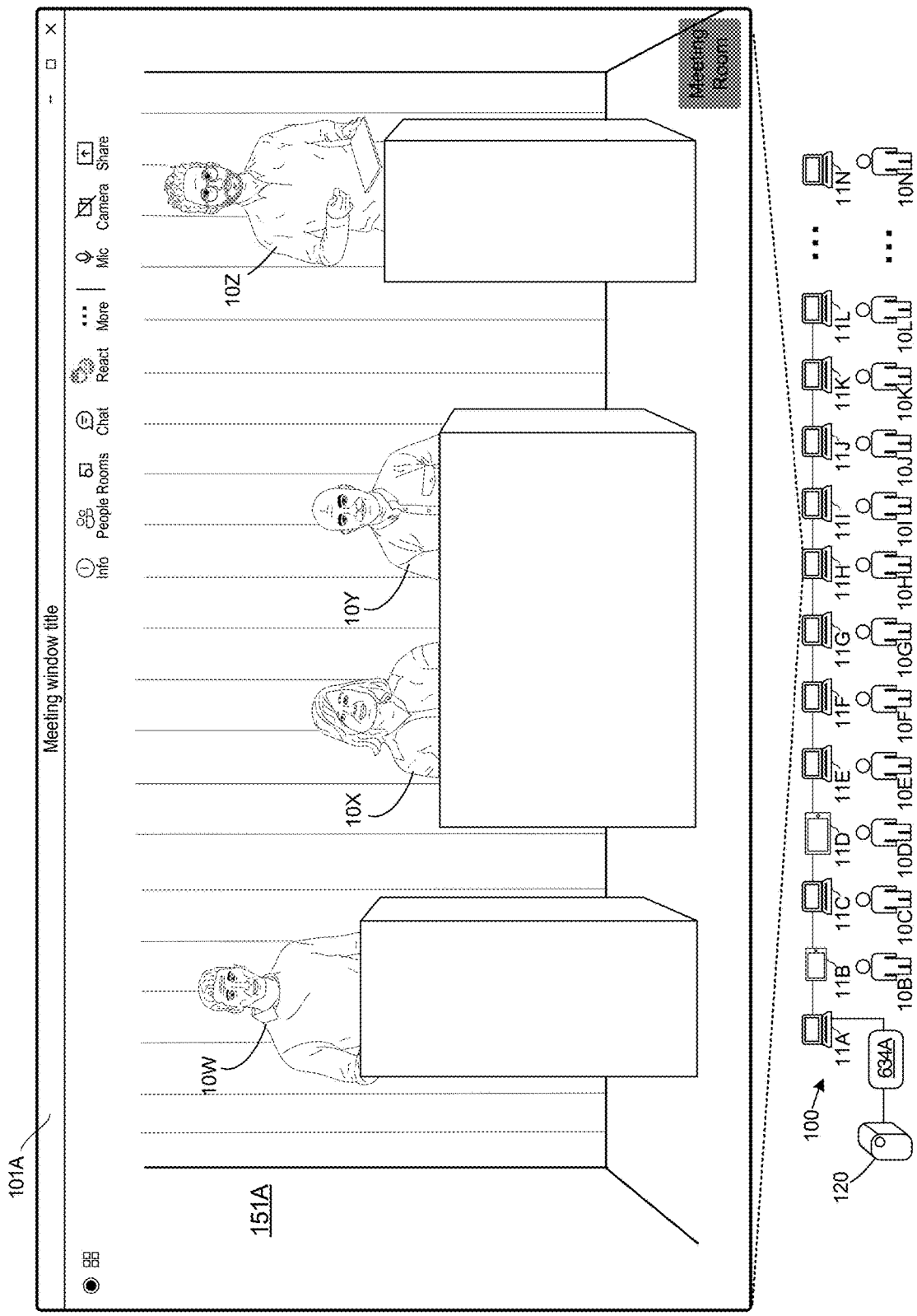

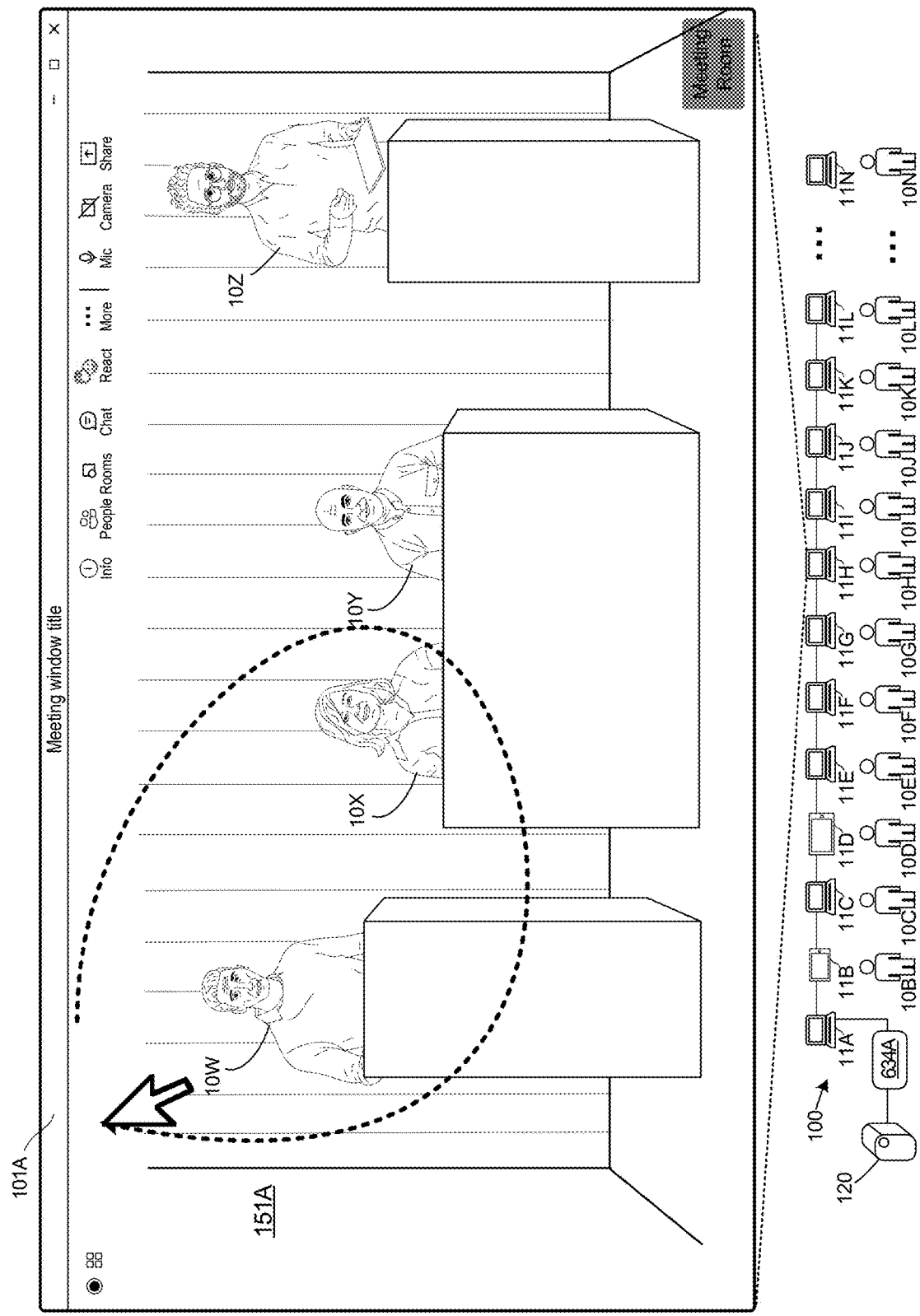

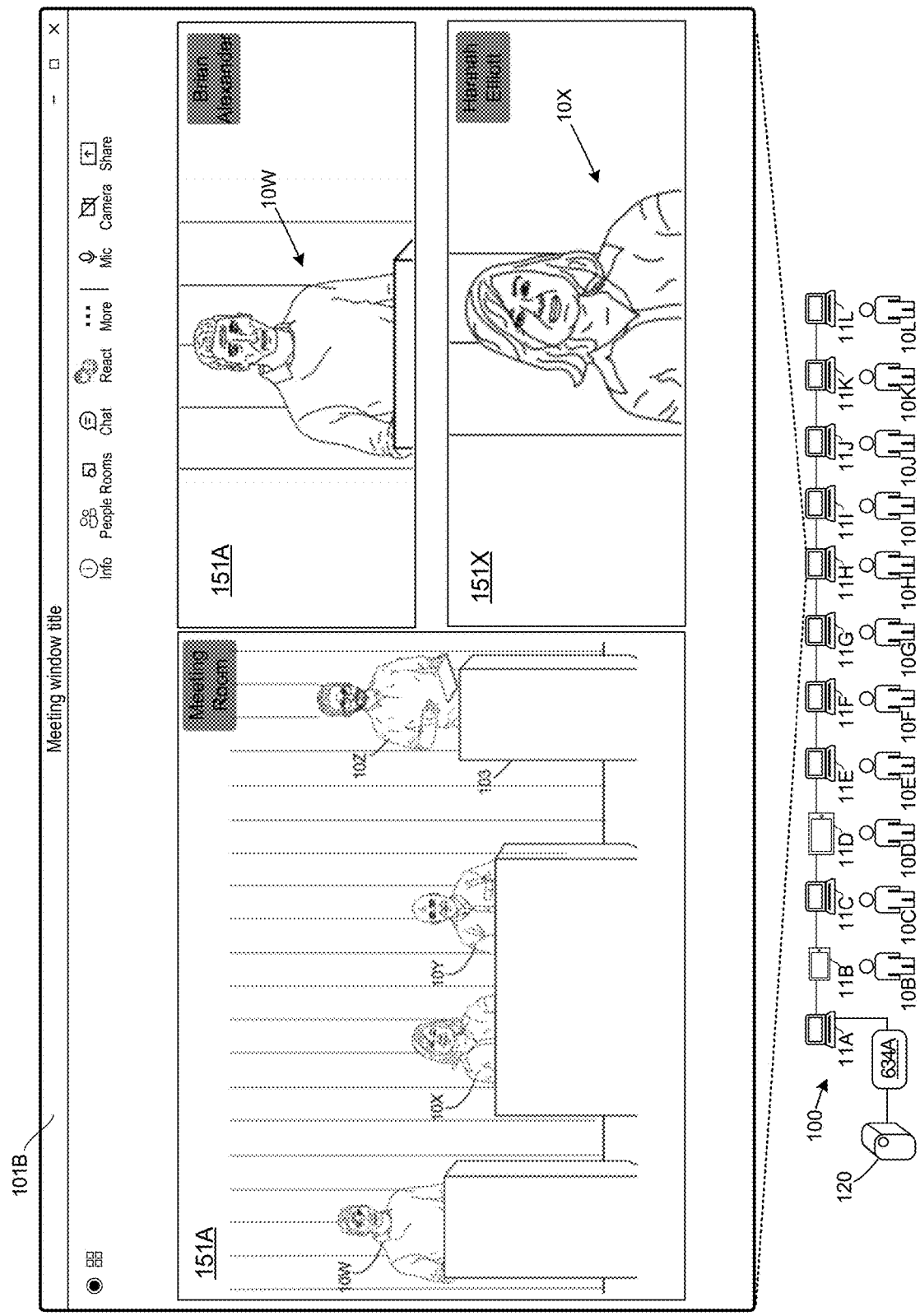

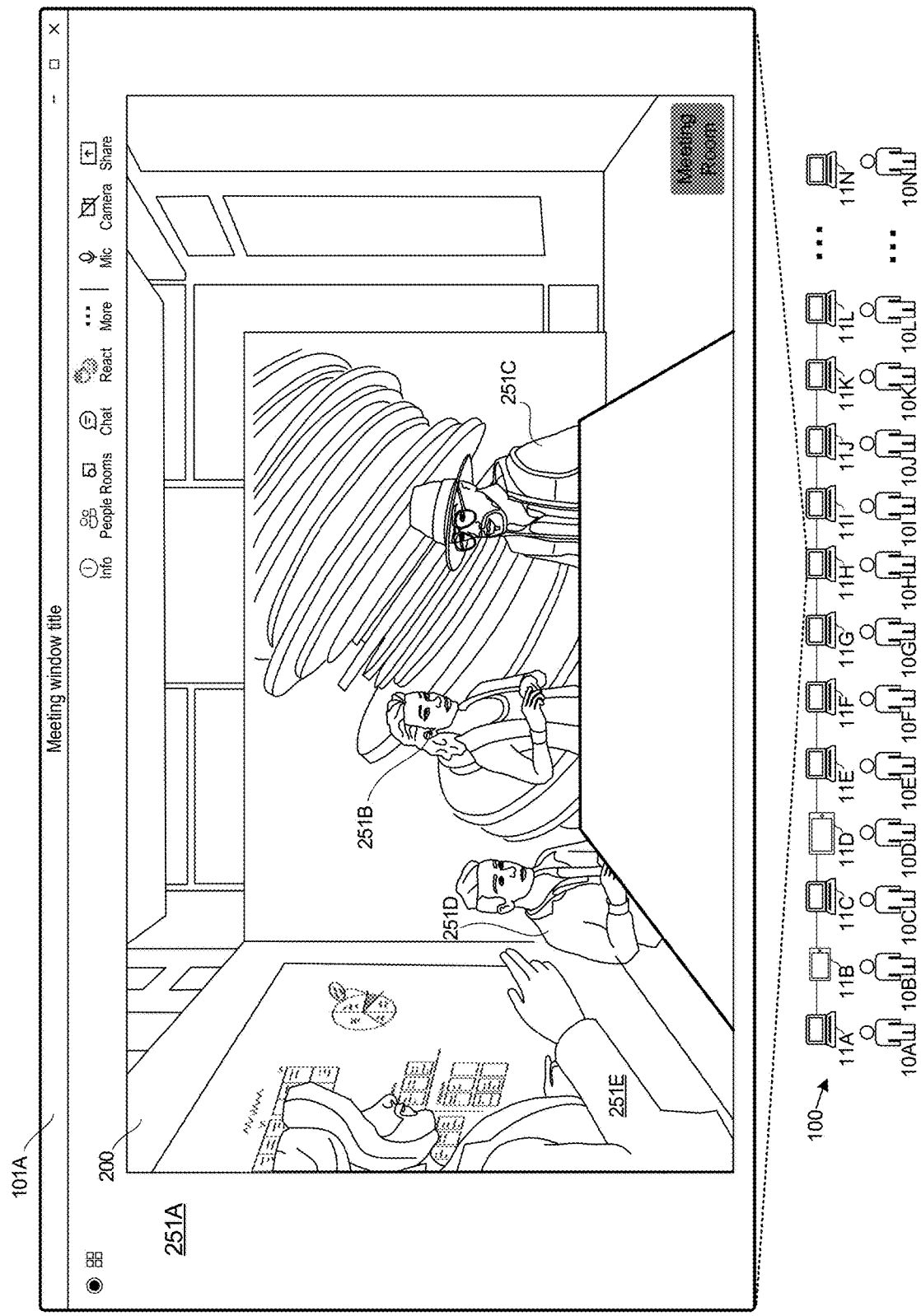

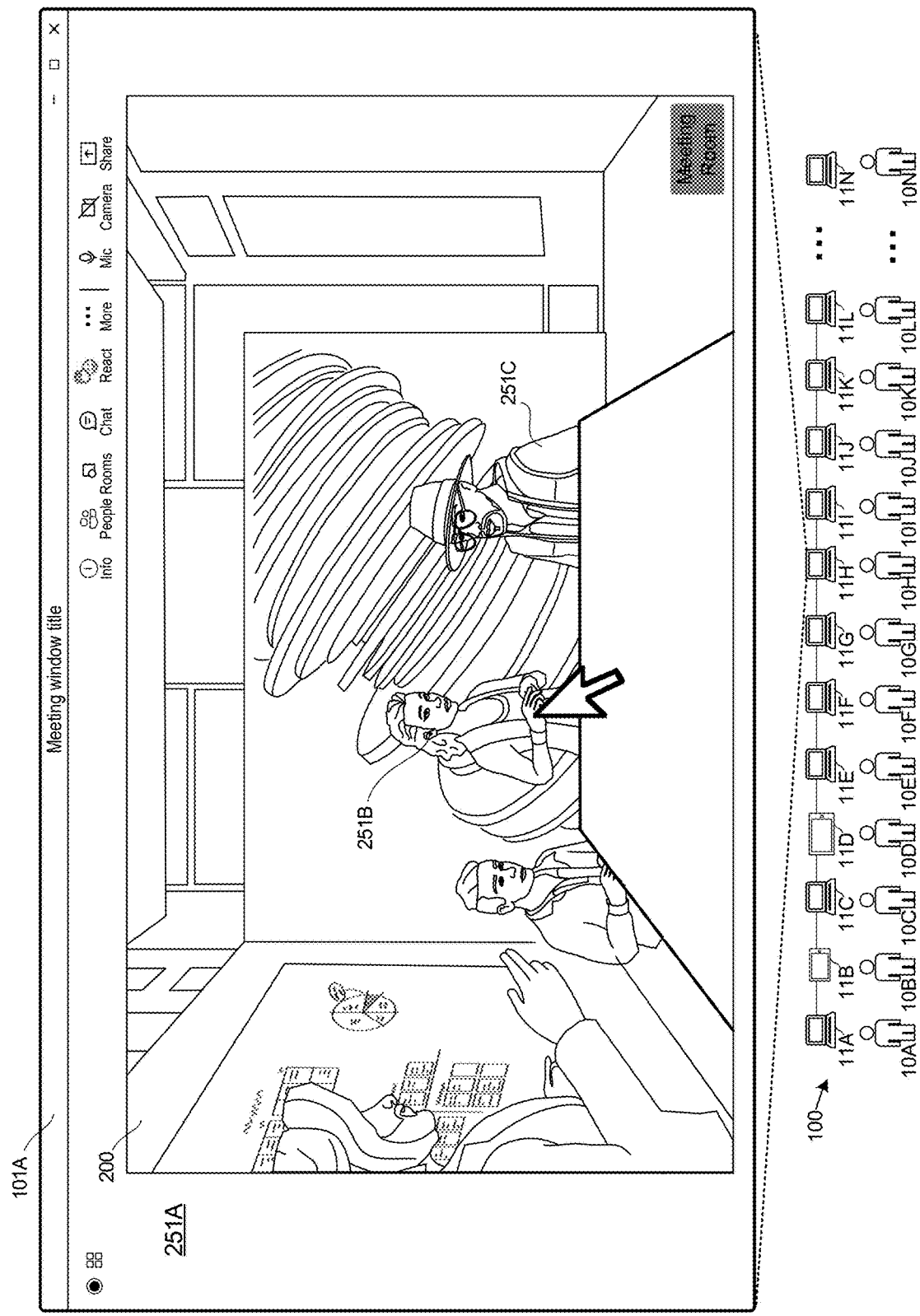

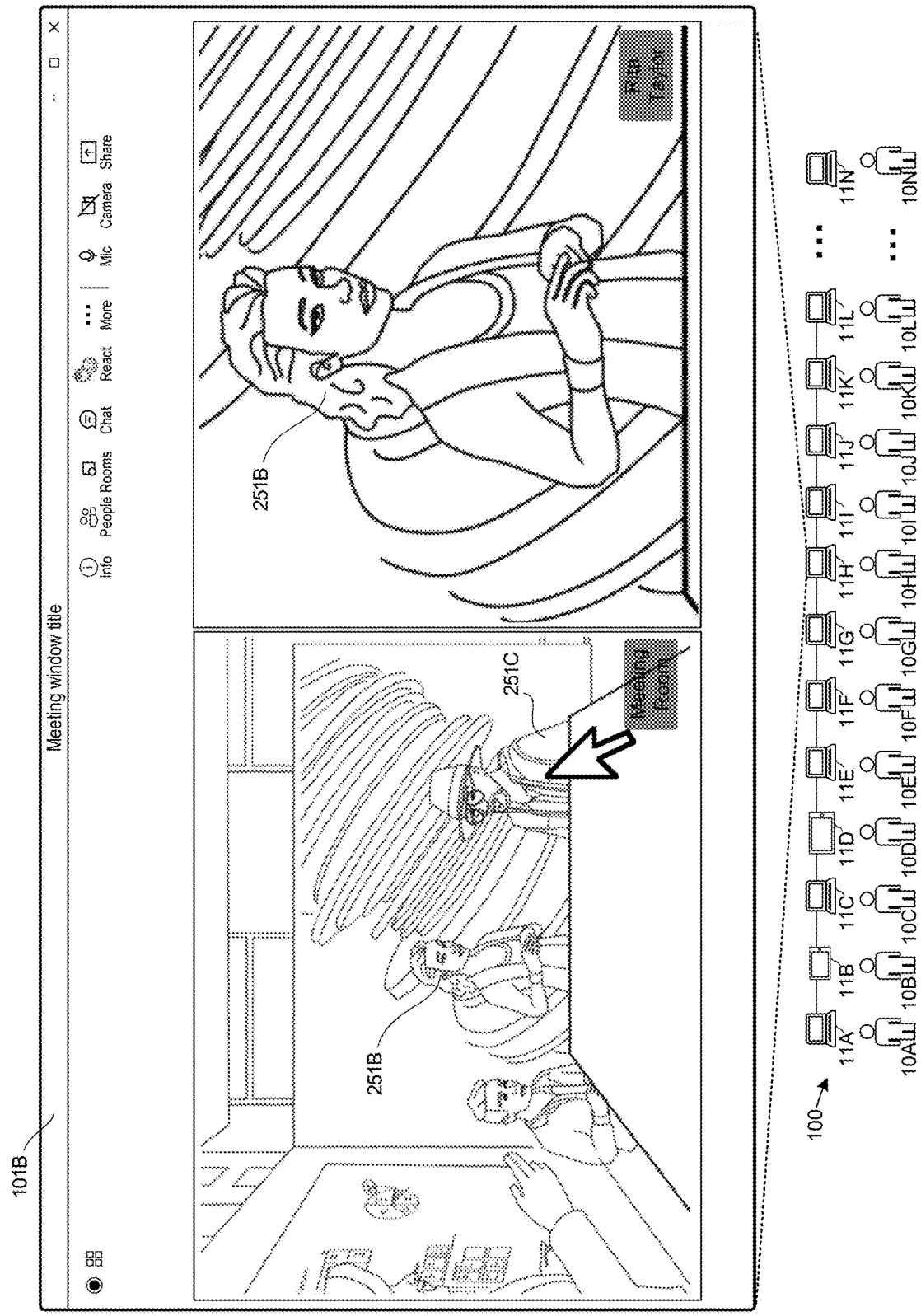

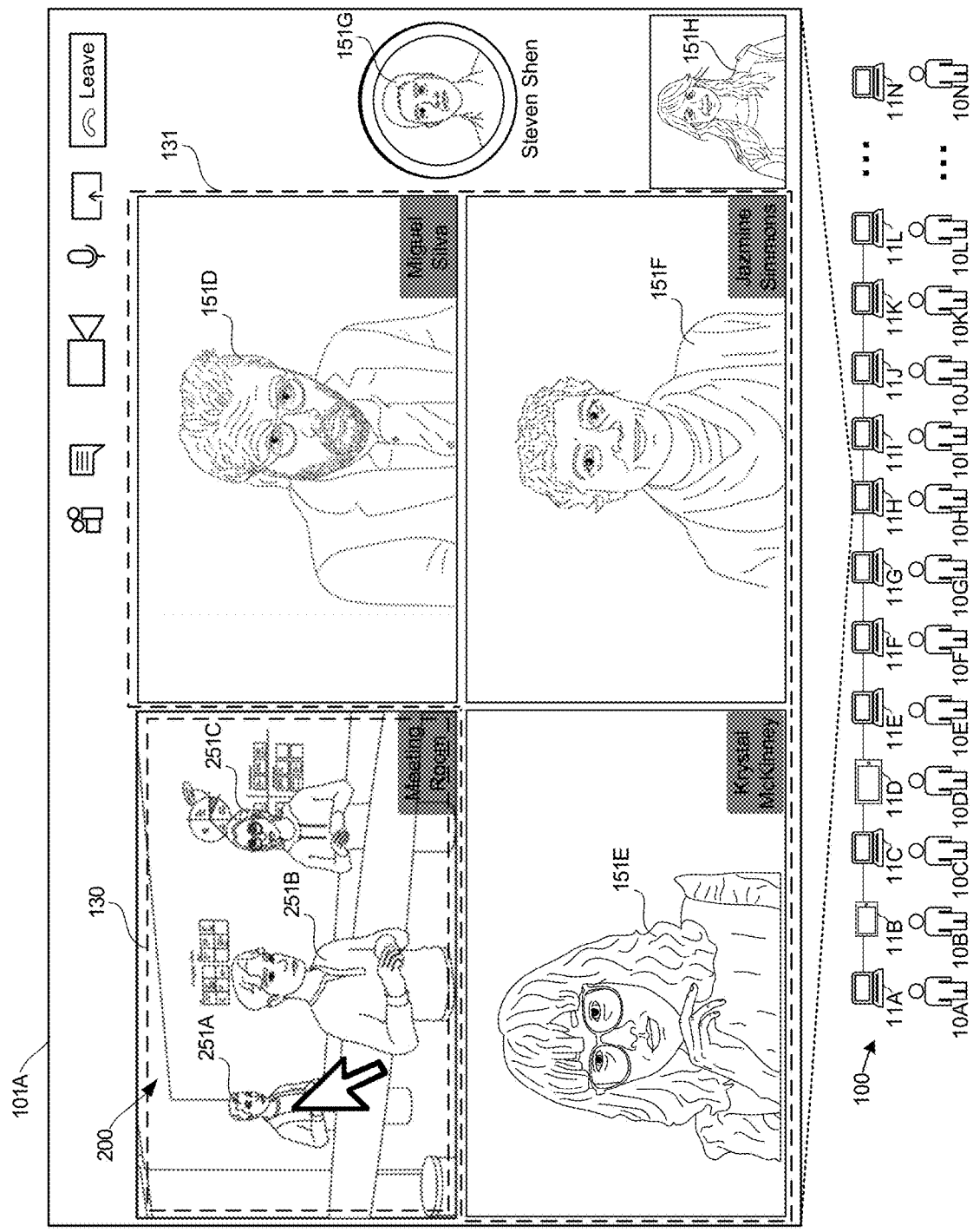

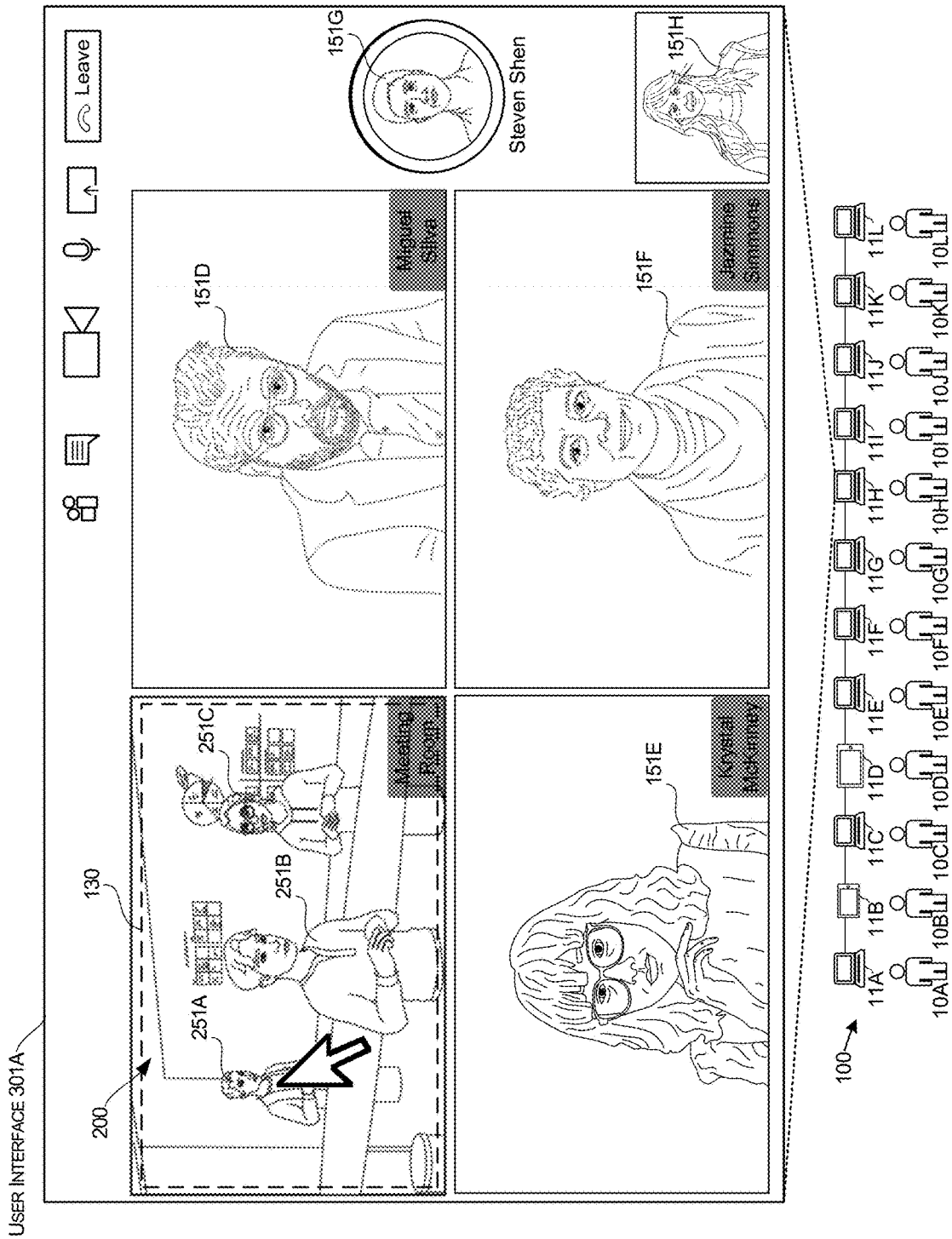

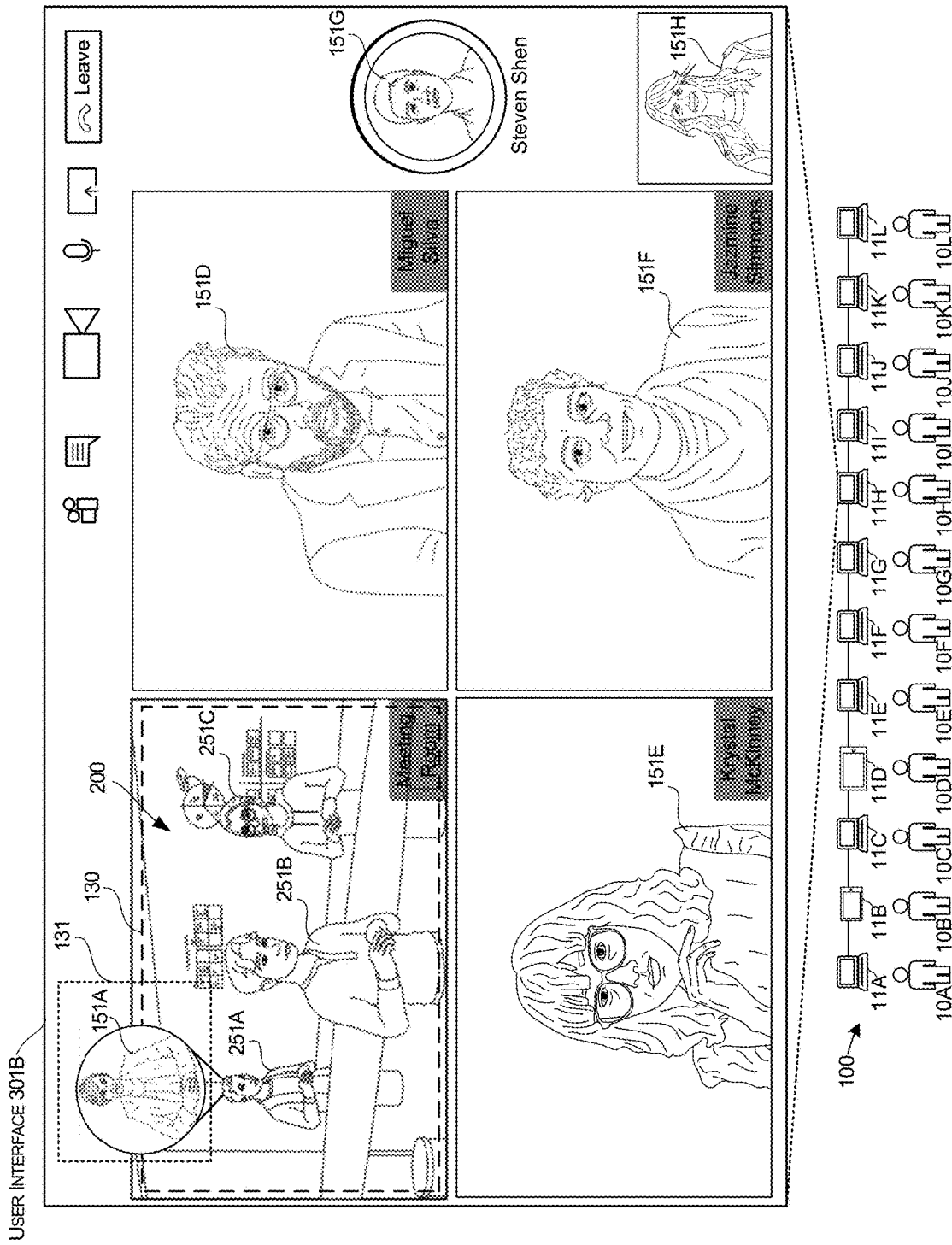

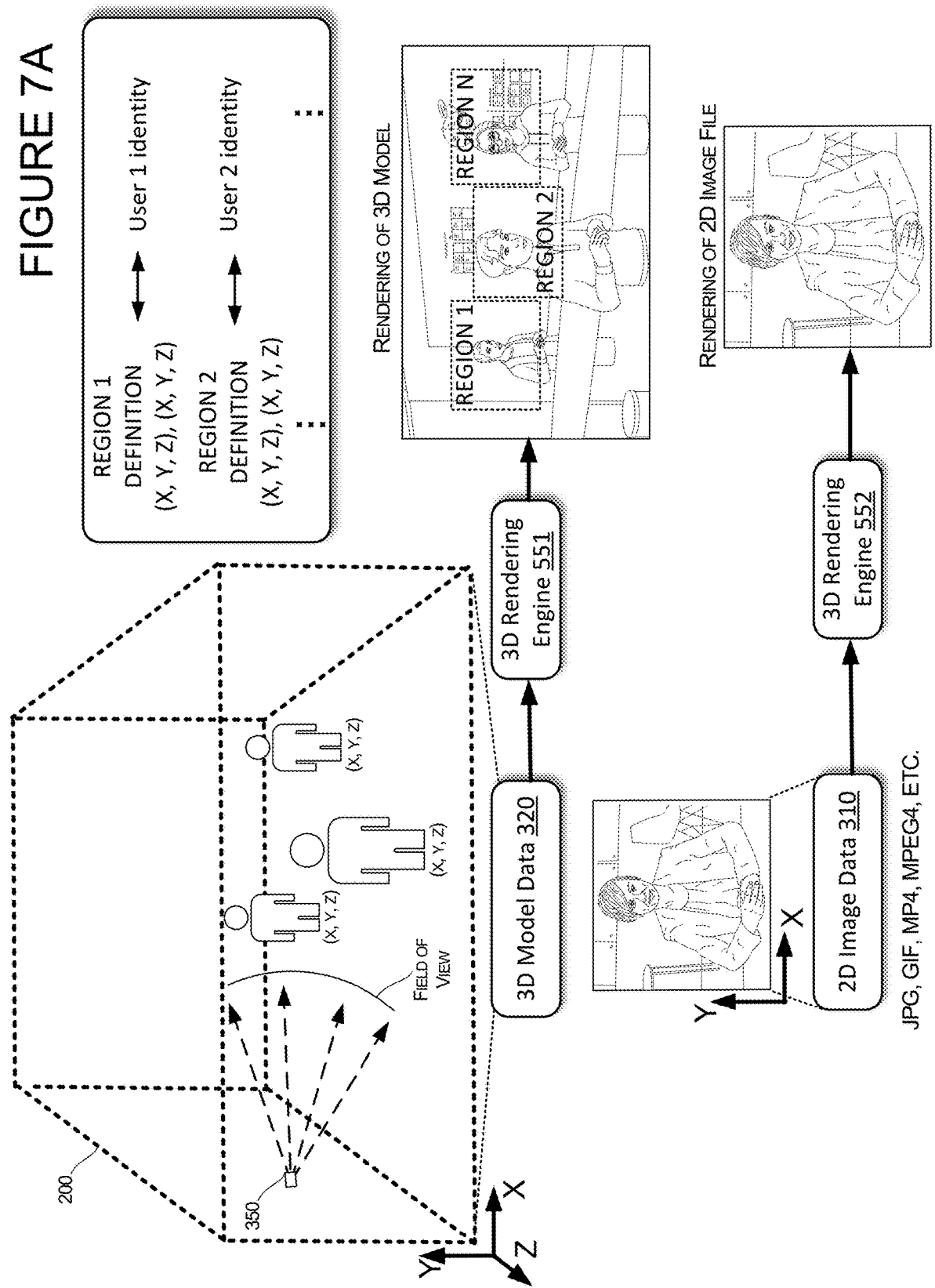

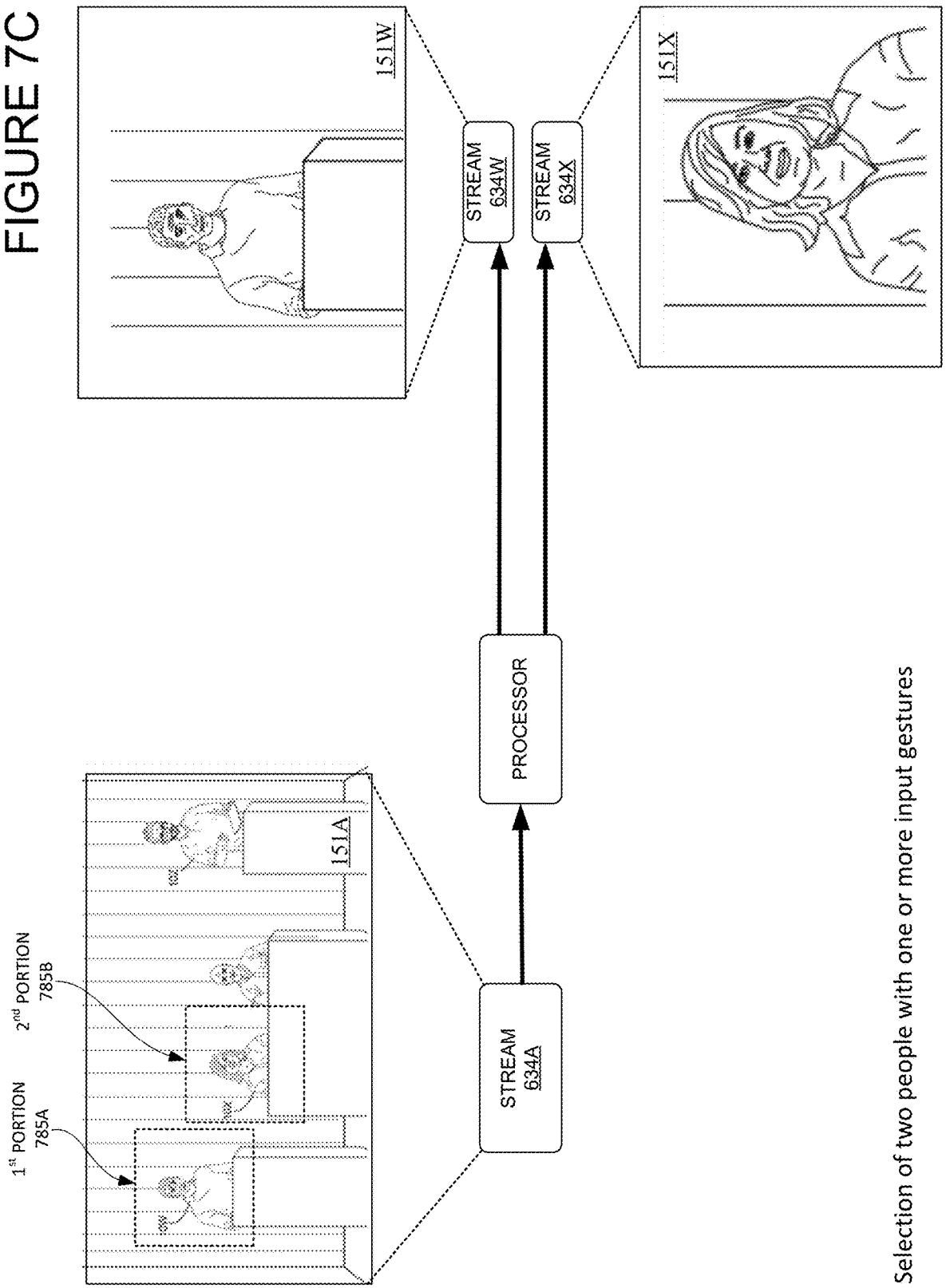

CUSTOMIZATION OF A USER INTERFACE DISPLAYING A RENDERING OF MULTIPLE PARTICIPANTS OF A HYBRID COMMUNICATION SESSION

BACKGROUND

A hybrid meeting involves attendees at a physical location and attendees at remote locations. This can involve a meeting with participants attending from a conference room, and at the same time, the meeting is streamed to online attendees. There are a number of different types of systems that allow users to participate in hybrid meetings. For example, some systems include conference room equipment, such as a camera that is directed to a stage. As presenters enter the stage, a video stream generated by the camera can be shared with a number of remote participants. The presenter can share content with the participants using video streams, files, chat messages, emails, etc. Some systems provide a user interface that shows a rendering of the participants on the stage along with individual renderings of remote participants.

One of the main issues with hybrid meeting systems is that there may be scenarios where the participants of a meeting may have trouble setting some user activity due to a layout of the video renderings. Renderings that show several participants sharing a conference room camera may not show the same level of detail as renderings showing a single person. Given that there may be a size disparity between the renderings of conference room participants versus renderings of online participants, viewers may not see each conference room participant clearly. This issue may be difficult for viewers to determine which person is speaking. Also, when it comes to renderings that depict a group of people, viewers of that rendering may miss certain gestures which can be important in interpreting a broader context of a conversation. This issue can be exacerbated when a rendering of a group of participants includes a large number of people.

In addition, some existing systems do not allow participants of a meeting to change the way they are displayed in a meeting. For example, a user may join a meeting from a conference room computer, and in using that computer, they may be part of a group video or no be pictured in the meeting user interfaces at all. in some cases, when that user wants to share a dedicated video stream of themselves to others, they have to exit the meeting and re-enter with another device. This can greatly detract from the flow of a meeting, cause delays, and may even fully restrict users from sharing content particularly if they want to share a file from the original computer.

These shortcomings can lead to ineffective interactions between a computing device and a user, particularly during a communication session. For example, the above-described issues can cause a number of inefficiencies as it may require a user to carefully scan a user interface for relevant activity. This can be difficult when the user is looking at a rendering of a hybrid meeting with lots of people displayed in one video stream or a rendering that is displayed on a small display screen. This can ultimately lead to a loss in user engagement and cause fatigue.

Computing devices that do not promote user engagement, or worse, contribute to a loss of user engagement and subpar interactions, can lead to production loss and inefficiencies with respect to a number of computing resources. For instance, when a user becomes fatigued or disengaged, that user may need to refer to other resources, such as documents or use other forms of communication, e.g., texts or chat messages, when shared content is missed or overlooked. Missed content may need to be re-sent when viewers miss salient points or cues during a live meeting. Such activities can lead to inefficient or duplicative use of a network, processor, memory, or other computing resources. Thus, there is an ongoing need to develop improvements to help make the user experience of communication systems more engaging and more like, or better than, an in-person meeting.

SUMMARY

The techniques disclosed herein enable systems to customize a user interface displaying an image of multiple participants of a hybrid communication session. In some configurations, the system allows a user to make one or more selections of attendees from a video stream that includes multiple attendees, such as the scene of a conference room or a camera focusing on a group of audience. In response to each selection, the system identifies each of the selected attendee(s) from the video stream of the conference room. The system also generates individual video streams of each of the selected attendee(s) by extracting images of the selected attendee(s) from the video stream of the conference room. The system that utilizes each of the video streams for each selected attendee to generate additional renderings to accompany the rendering of the video stream of the conference room. In some configurations, each video rendering depicting a selected attendee is positioned in additional tiles that are added to a user interface in response to the selection of each user. Each video rendering depicting a selected attendee may also have an altered perspective level that gives the appearance that a camera has zoomed in on each of the selected attendees. This change in the perspective or zoom level provides more details of the selected user and allows viewers to see gestures. By allowing users to generate additional renderings of people that are initially displayed in a group video rendering, the system can allow viewers to control a user interface format to view details of each person that may not be observable from the initial user interface arrangement.

The techniques disclosure in provide a number of technical benefits. For instance, by providing systems that can generate additional renderings of meeting participants from a video stream of multiple participants, computers can more effectively convey a broader context of a meeting. Also, by viewing an enlarged video rendering of a selected person, instead of relying on a group image showing that person at a reduced size, users can readily benefit from viewing subtle gestures and body language. This helps mitigate occurrences where shared content is missed or overlooked. This can reduce occurrences where users need to re-send information. More effective communication of shared content can also help avoid the need for external systems, such as mobile phones for texting and other messaging platforms. This can help reduce the duplicative use of network, processor, memory, or other computing resources especially when prolonged meetings or additional meetings can be avoided.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 1 illustrates an example scenario where a camera is capturing an image of several in-room participants of a hybrid meeting.

FIG. 2C illustrates a second user interface arrangement showing a rendering of an image of several in-room participants of a hybrid meeting with the addition of a second rendering of a user selected by the input.

FIG. 2D illustrates an action of a user input at the second user interface arrangement showing a rendering of an image of several in-room participants of a hybrid meeting with the addition of a second rendering of a person selected by the first input.

FIG. 3A illustrates a user interface arrangement that provides a rendering of an image of several in-room participants of a hybrid meeting.

FIG. 3B illustrates an action of a user input at a user interface arrangement that provides a rendering of an image of several in-room participants of a hybrid meeting.

FIG. 3C illustrates a second user interface arrangement showing a rendering of an image of several in-room participants of a hybrid meeting with the addition of two additional rendering of users selected by the input.

FIG. 4A illustrates a user interface arrangement that provides a rendering of virtual environment showing representations of several in-room participants of a meeting.

FIG. 4B illustrates an action of an input selecting a user at a user interface arrangement that provides a rendering of virtual environment showing representations of several in-room participants of a meeting.

FIG. 4D illustrates an action of a user input at the second user interface arrangement showing a rendering of virtual environment showing representations of several in-room participants with the addition of a second representation of person selected by the first input.

FIG. 5B illustrates an action of an input selecting a user at a first user interface arrangement that provides a rendering of virtual environment showing representations of several in-room participants of a meeting.

FIG. 6B illustrates an action of an input selecting a user at a first user interface arrangement that provides a rendering of virtual environment showing representations of several in-room participants of a meeting.

FIG. 6C illustrates a second user interface arrangement showing a rendering of virtual environment showing representations of several in-room participants with the addition of a second image of a user that is selected using an input, the second image being a live video stream positioned in a region reserved for active speakers, where the region overlaps with the virtual environment.

FIG. 7A illustrates a scenario where user representations are positioned within a 3D environment relative to a virtual camera.

FIG. 7C illustrates how the system can generate several focused streams from a stream of video data depicting multiple people.

DETAILED DESCRIPTION

FIG. 1 illustrates an example scenario where a field of view of a camera 120 is directed toward several in-room participants 10 positioned in a physical room 110 used for a hybrid meeting. In this example, two participants User 10W and User 10Z are standing at podiums, and two other participants User 10X and User 10Y are sitting at a desk. In this example, the camera 120 is generating video data that is communicated to a system managing a communication session. The communication session can be a meeting, a broadcast, a private video session, etc.

Figure 2A:
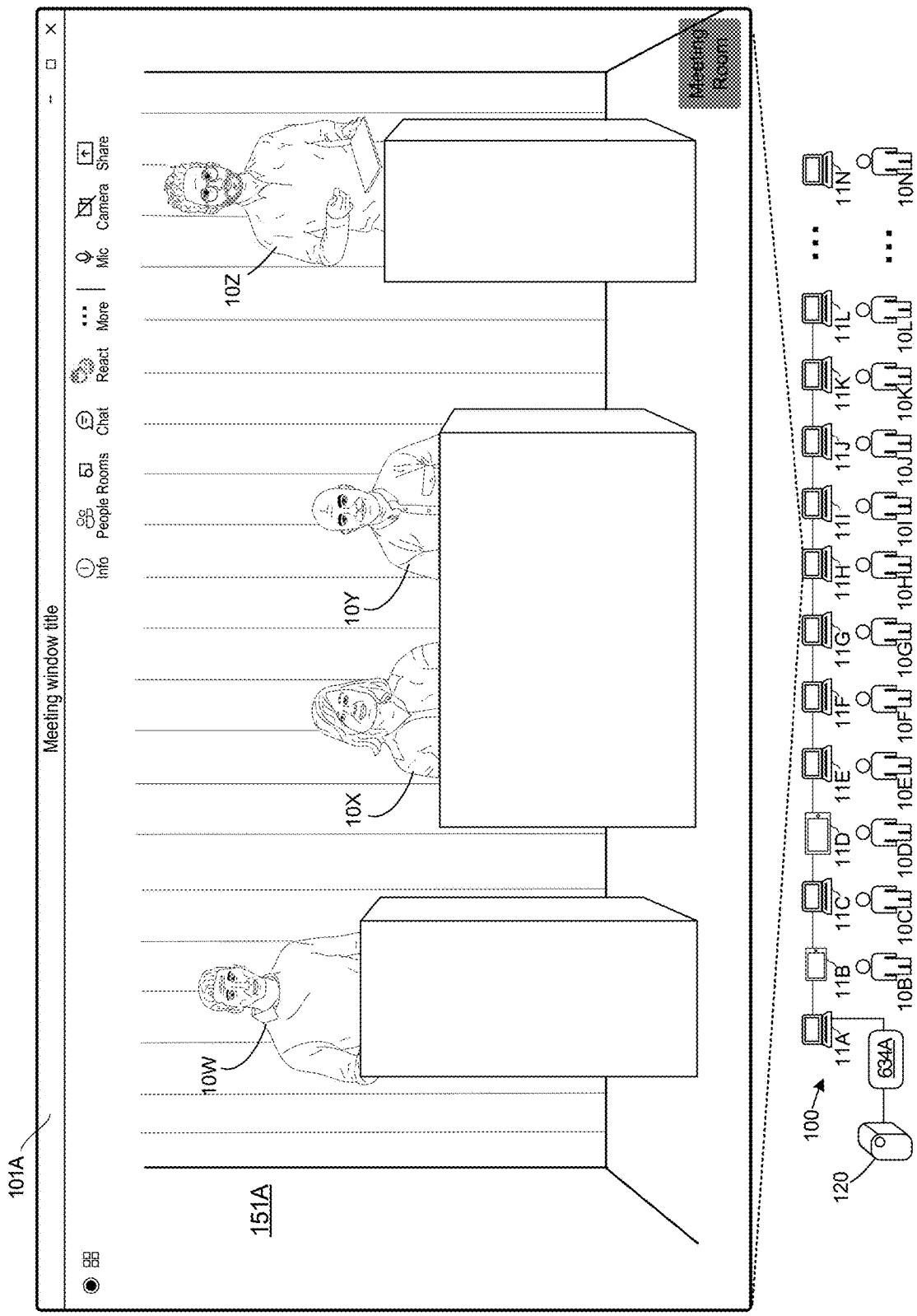
FIG. 2A illustrates a user interface arrangement that provides a rendering of an image of several in-room participants of a hybrid meeting.

FIG. 2A illustrates aspects of a system 100 for managing a communication session. The system 100 can receive the video data that is generated by the camera 120 shown in FIG. 1. The system 100 can include a number of computers 11 each corresponding to a number of users 10. In this example, the first computer 11A is associated with four users: User 10W, User 10X, User 10Y, and User 10Z. Each of these users can also be respectively referred to herein as User W, User X, User, Y, and User Z. These users are depicted in the video stream managed by the first computer 11A and may have the ability to control the first computer 11A. A second computer 11B is associated with a second user, User 10B, a third computer 11C is associated with a third user, User 10C, up to a predetermined number of users, N users. Each of these users can also be respectively referred to herein as User A, User B, User, C, up to User N. The computers can be in the form of desktop computers, head-mounted display units, tablets, mobile phones, etc.

The system 100 can cause each computer 11 to generate a user interface showing aspects of the communication session to each user participating in the communication session. In this example, a first user interface arrangement 101A is initially displayed to one or more users, such as User H, using their associated computers. The first user interface arrangement 101A includes a rendering 151A of a first image data 634A depicting a set of participants 10W-10Z that are positioned within a field of view of the camera 120 generating the first image data 634A.

As shown in FIG. 2A, the system can allow a user to make one or more selections of attendees depicted in the video stream that includes multiple attendees. The system can receive an input from the one or more computing devices 11A-11Z, the input indicating a selection of at least one participant 10W of the set of participants 10W-10Z depicted in the first image data 634A. In this example, a user, such as User H, provides an input using a pointing device to select User W. Although this example illustrates a configuration where a user input involves a pointing device that selects one person, it can be appreciated that any type of input that identifies one or more users can be utilized. For instance, users can provide a voice command, a touch gesture, a pointing gesture captured by a camera, etc.

As shown in FIG. 2C, in response to the input, the system can identify each of the selected attendees and extract each of the selected attendees from the video stream of the conference room attendees. The system can then cause a transition of the first user interface arrangement 101A shown in FIG. 2A to the second user interface arrangement 101B shown in FIG. 2C. As shown, the first user interface arrangement 101A comprises the rendering 151A of the first image data 634A depicting the set of participants 10W-10Z and does not concurrently display an additional rendering of the at least one participant 10W that is identified in the input. Also shown, the second user interface arrangement 101B comprises the rendering 151A of the first image data 634A depicting the set of participants 10W-10Z concurrently with the additional rendering 151W of the at least one participant 10W using the at least one portion of the first image data 634A that is extracted from the first image data 634A. Additional details of the video extraction process is described in further detail below with respect to FIGS. 7B and 7C.

Figure 2B:
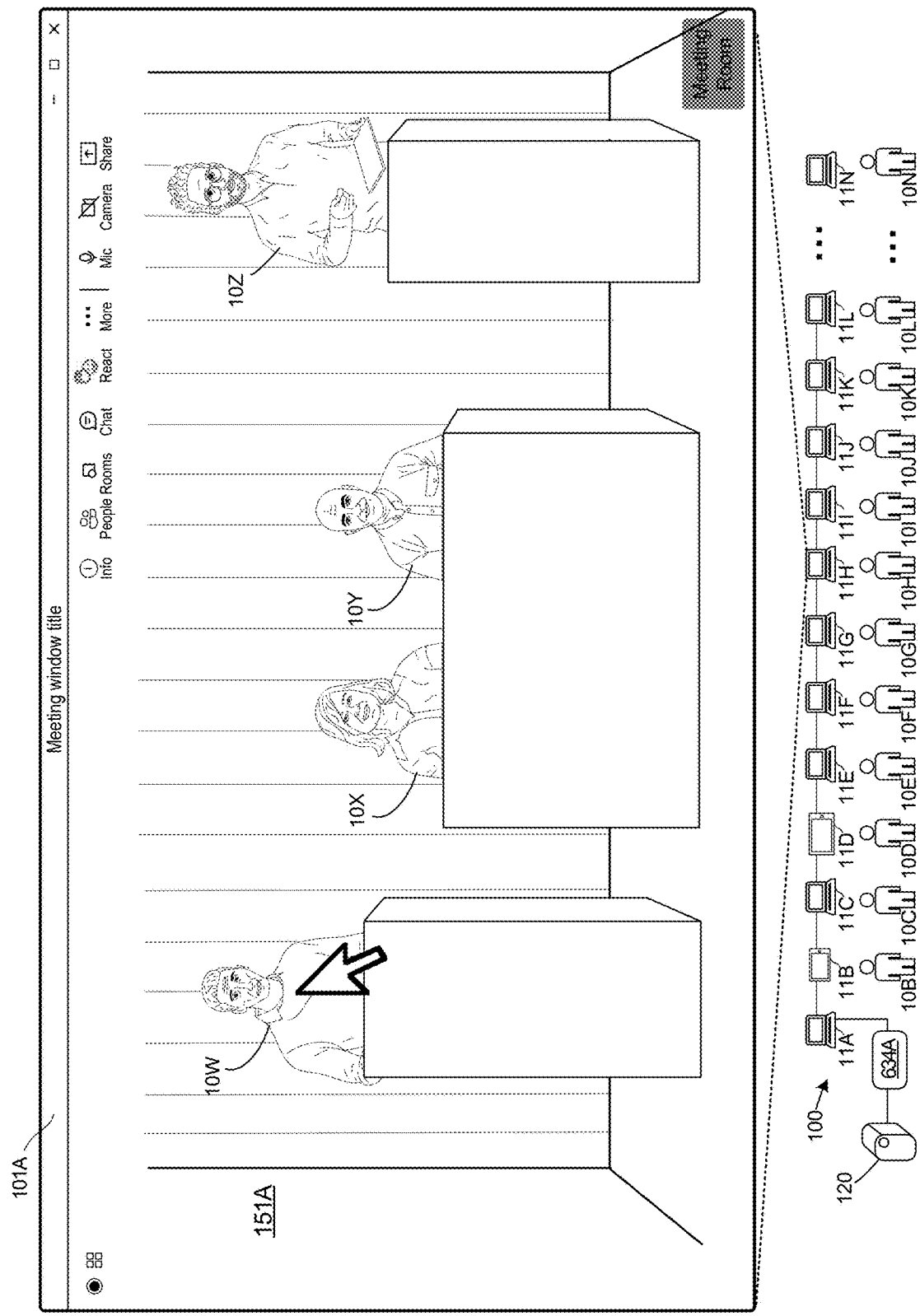
FIG. 2B illustrates an action of a user input at a user interface arrangement that provides a rendering of an image of several in-room participants of a hybrid meeting.
Figure 2E:
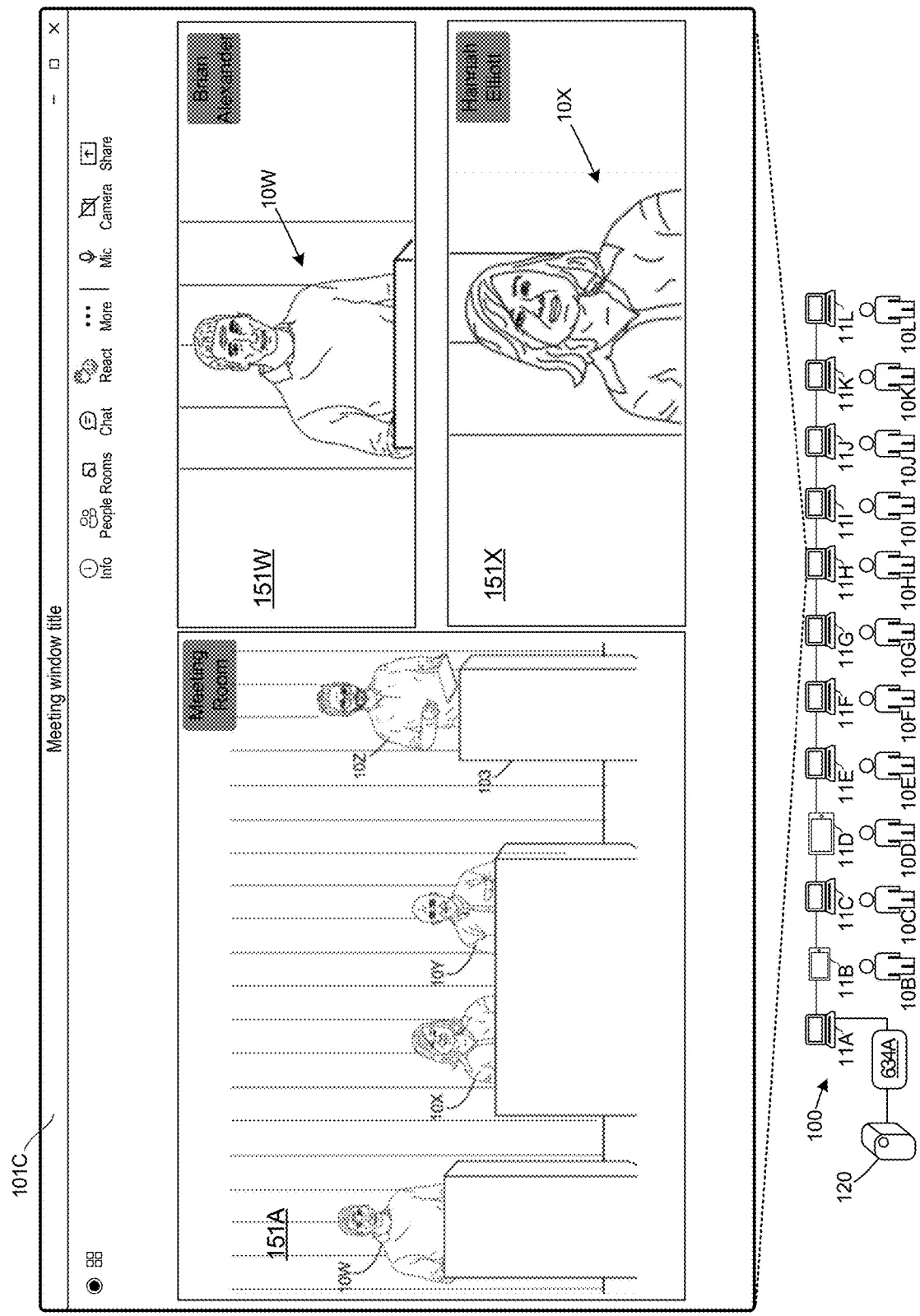
FIG. 2E illustrates a third user interface arrangement showing a rendering of an image of several in-room participants of a hybrid meeting with the addition of a second rendering of a person selected by the first input and the addition of a second rendering of another person selected by the second input.

In some configurations, the system can generate an additional rendering for each attendee that is selected by one or more user inputs. FIGS. 2D and 2E illustrates an example of this configuration. As shown in FIG. 2D, a user, such as User H, provides a second input that indicates a selection of User X. This input is applied to the second user interface arrangement comprising the rendering 151A of the first image data 634A depicting the set of participants 10W-10Z concurrently with the additional rendering 151W of the at least one participant 10W.

As shown in FIG. 2E, in response to the second input identifying User X, system can identify the selected attendee(s) and extract the selected attendee(s) from the video stream of the conference room attendees. The system can then cause a transition of the second user interface arrangement 101B shown in FIG. 2C to the third user interface arrangement 101C shown in FIG. 2E. As shown, the third user interface arrangement 101C comprises the rendering 151A of the first image data 634A depicting the set of participants 10W-10Z concurrently with the additional rendering 151W of the at least one participant 10W displayed in response to a prior input, and another additional rendering 151X of the at least one other participant 10X displayed in response to the second input. In some embodiments, the system can also display the names or other identities for the attendees that are identified in the user selection input(s). In some embodiments, the system can also add a new cell to a grid when the user interface arrangement includes a grid layout for the renderings.

FIGS. 3A-3C illustrate another example of a user interface transition that can cause the display of several additional renderings in response to an input that identifies two or more attendees. In this example, a first user interface arrangement 101A is initially displayed to one or more users, such as User H, using their associated computers. The first user interface arrangement 101A includes a rendering 151A of a first image data 634A depicting a set of participants 10W-10Z that are positioned within a field of view of the camera 120 generating the first image data 634A.

As shown in FIG. 3A, the system can allow a user, such as User H, to make one or more selections of attendees depicted in the video stream that includes multiple attendees. The system can receive an input from the one or more computing devices 11A-11Z, the input indicating a selection of at least one participant 10W of the set of participants 10W-10Z depicted in the rendering 151A of the first image data 634A. In this example, a user, such as User H, provides an input using a pointing device to select User W and User X. Although this example illustrates a configuration where a user input involves a pointing device that selects two people with a gesture, it can be appreciated that any type of input that identifies two or more users can be utilized. For instance, users can provide a voice command, a touch gesture, a pointing gesture captured by a camera, etc.

As shown in FIG. 3C, in response to the input, the system can identify each of the selected attendees and extract each of the selected attendees from the video stream of the conference room attendees, e.g., the image data 634A generated by a camera of the first computing device 11A. The system can then cause a transition of the first user interface arrangement 101A shown in FIG. 3A to the second user interface arrangement 101B shown in FIG. 3C. As shown, the first user interface arrangement 101A comprises the rendering 151A of the first image data 634A depicting the set of participants 10W-10Z and does not concurrently display an additional rendering of the at least two participants, User 10W or User X, that is identified as a result of the input. Also shown, the second user interface arrangement 101B of FIG. 3C comprises the rendering 151A of the first image data 634A depicting the set of participants 10W-10Z concurrently with the additional rendering 151W of one of the selected participants, User W, using the at least one portion of the first image data 634A, and another additional rendering 151X of the other selected participant, User X, using another portion of the first image data 634A. By the use of any suitable technique for retrieving identity data, the system can also identify the attendees associated with the input, and retrieve information such as their name or other identity information. The retrieved information can be displayed in conjunction with a rendering of those attendees, as shown.

The techniques disclosure and can also apply to renderings of virtual environments. When a virtual environment comprises avatars of multiple attendees, a user viewing the virtual environment can select one of the avatars and cause the system to display a second rendering of that selected user. The second rendering of the selected user can be a rendering in the form of an avatar. FIGS. 4A-4E illustrate an example of such embodiments. The second rendering of the selected user can also be a rendering in the form of a live video stream generated by a camera directed toward that selected user. FIGS. 5A-5C and 6A-6C illustrate examples of such embodiments.

Figure 4C:
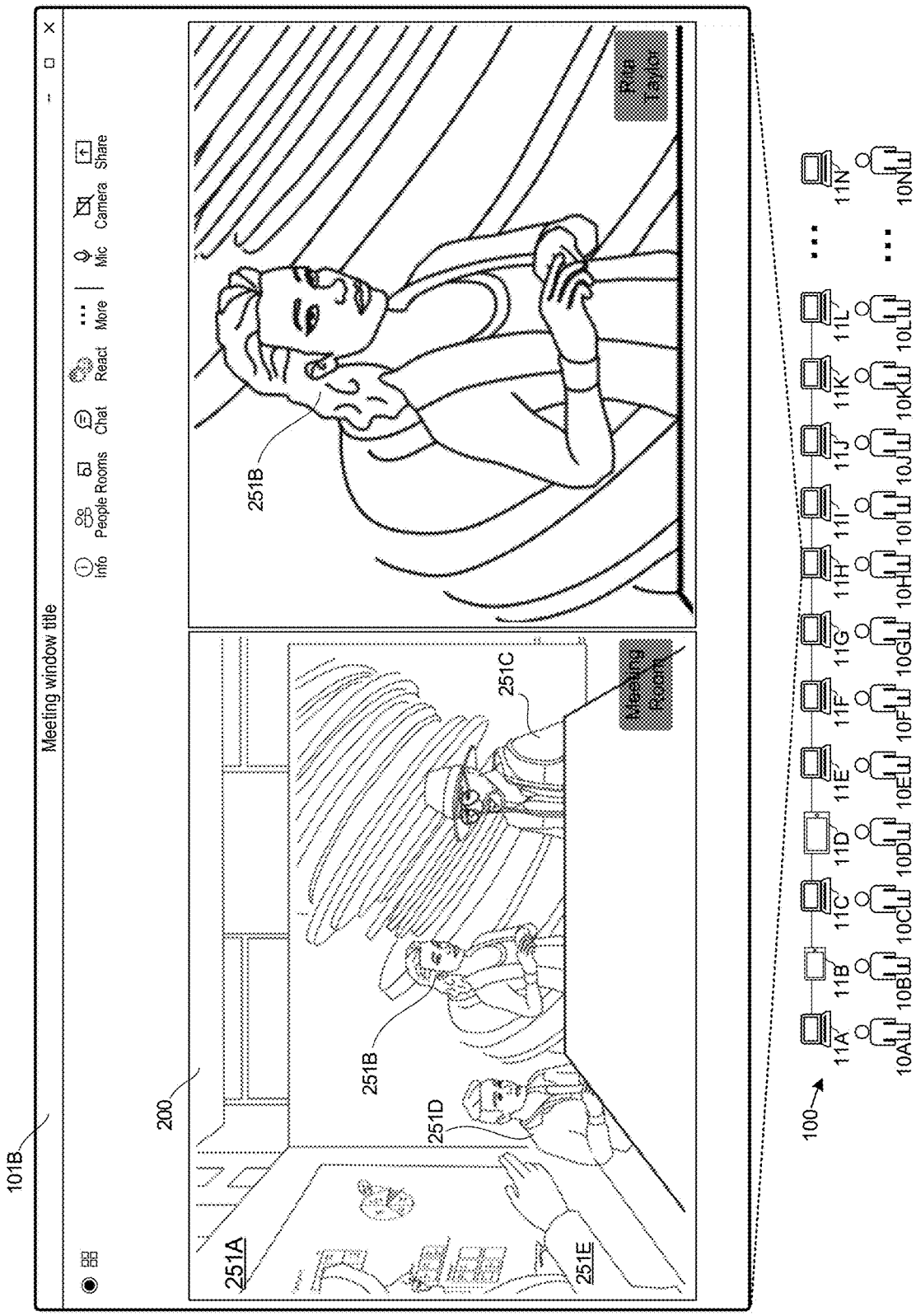
FIG. 4C illustrates a second user interface arrangement showing a rendering of virtual environment showing representations of several in-room participants with the addition of a second representation of a user selected by the input.

Referring now to FIGS. 4A-4E, an example showing an embodiment where a second rendering of a selected user is in form of an avatar. In this embodiment, as shown in FIG. 4A, the system 100 can generate a first user interface arrangement 101A showing a 3D rendering of a virtual environment 200 that includes a number of avatars 251 each representing attendees of a communication session.

As shown in FIG. 4B, the system can receive an input selecting one of the avatars depicted in the 3D rendering of the virtual environment. In this example the input includes a selection of User B rendered as 3D representation 251B. In response to the input, the system causes a transition between the first user interface arrangement 101A of FIG. 4A to a second user interface arrangement 101B of FIG. 4C. As shown in FIG. 4A, the first user interface arrangement 101A comprises the rendering 251A of a 3D environment 200 that includes renderings 251B-251E of a set of participants 10B-10E and does not concurrently display an additional rendering of the User B that is identified in the input. As shown in FIG. 4C, the second user interface arrangement 101B comprises the rendering 251A of the 3D environment 200 that includes renderings 251B-251E of a set of participants 10B-10E and concurrently displays an additional rendering 251B of the User B that is identified in the selection input. This additional rendering 251B of the User B that is identified in the selection input can also be configured with a different perspective, which can include modifying the rendering to give the appearance of a zooming feature to provide more details of the selected user.

FIG. 4D illustrates an action of a second input at the second user interface arrangement 101B showing a rendering of virtual environment showing representations 251 of several in-room participants that includes a representation 251B of a user, e.g., User B. The second user interface arrangement 101B also includes a second representation 251B of person selected by the first input. The second input indicates a selection of another user, User C, who is represented by a first rendering of a representation 251C.

Figure 4E:
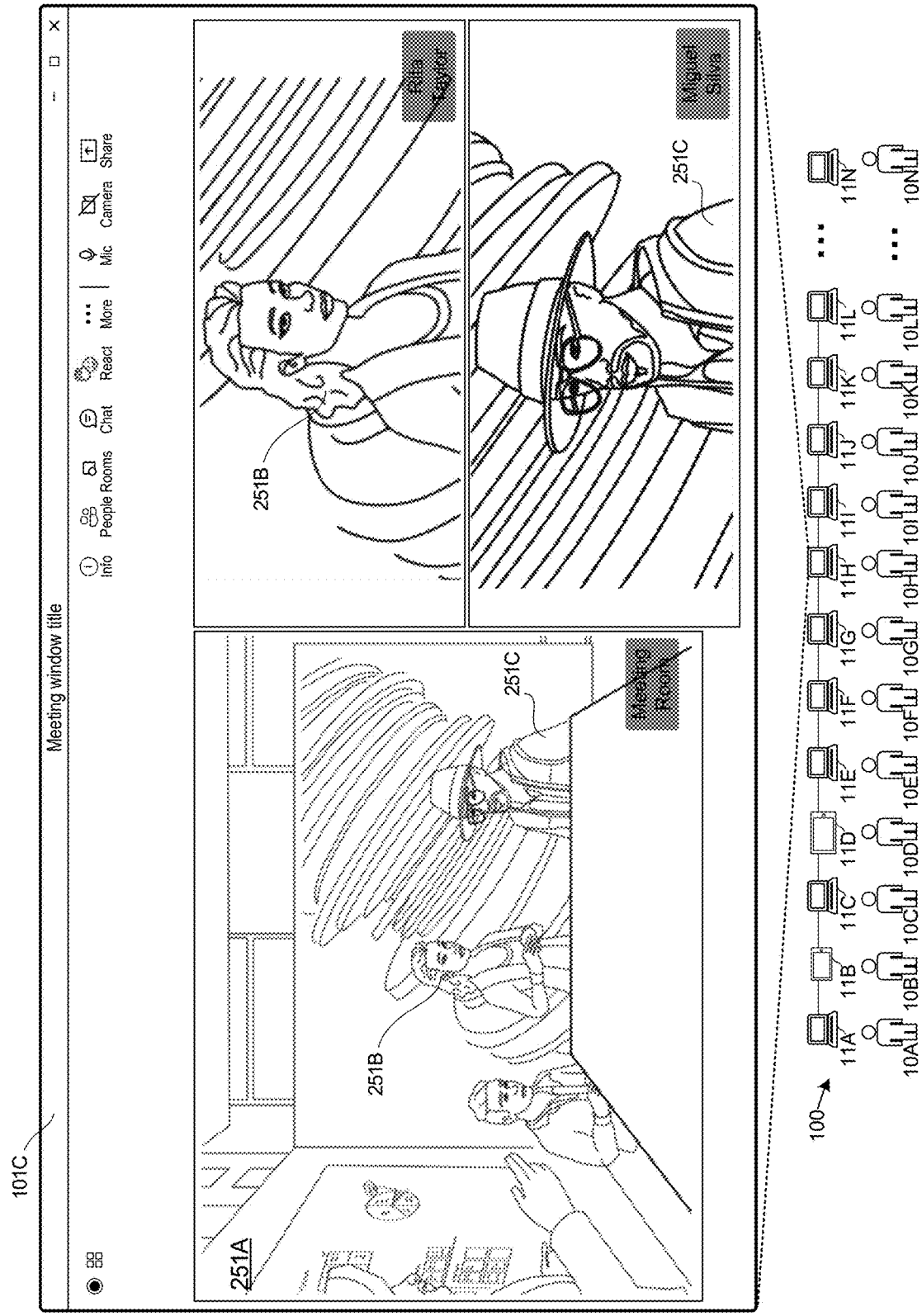
FIG. 4E illustrates a third user interface arrangement showing a rendering of virtual environment showing representations of several in-room participants with the addition of the second rendering of person selected by the first input and the addition of a second rendering of another person selected by the second input.

As shown in FIG. 4E, in response to the second input identifying User C, who is rendered as a 3D representation 251C, the system identifies the selected attendee(s) and extract the selected attendee(s) from the video stream of the conference room attendees. The system can then cause a transition of the second user interface arrangement 101B shown in FIG. 4C to the third user interface arrangement 101C shown in FIG. 4E. As shown, the third user interface arrangement 101C comprises the rendering 251A of the virtual environment showing representations of several in-room participants including a first representation 251B of User B and a first representation 251C of User C. The third user interface arrangement 101C of FIG. 4E also includes the addition of the second representation 251B of User B and a second representation 251C of User C. In some embodiments, the system can also display the names or other identities for the attendees that are identified in the user selection input(s). Also, in some embodiments, the system can also add a new grid cell for each additional rendering that is added as a result of the inputs identifying users who are to be displayed in a second rendering.

Figure 5A:
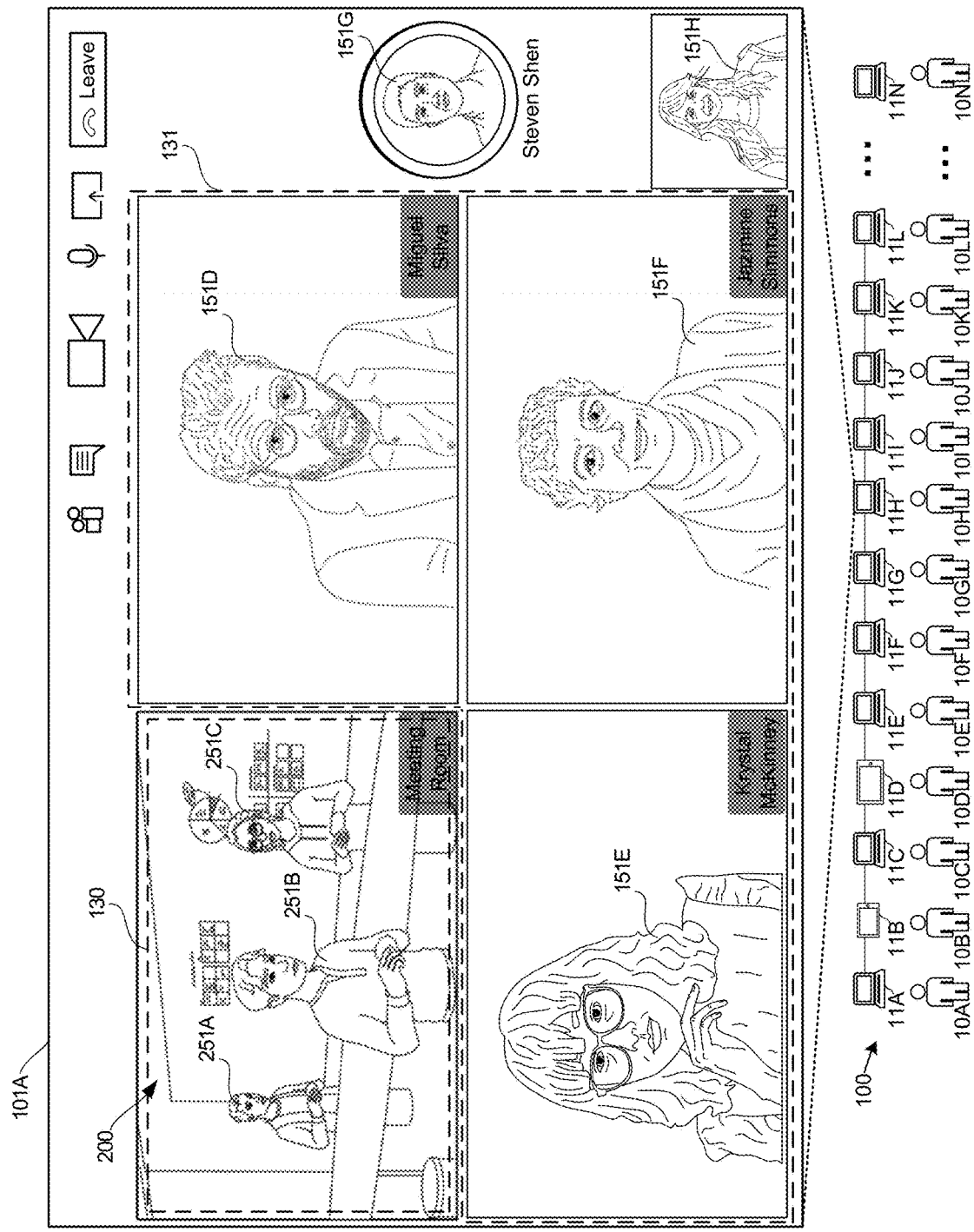
FIG. 5A illustrates a user interface arrangement that provides a rendering of virtual environment showing representations of several in-room participants of a meeting, the virtual environment being depicted with live video streams of other users.
Figure 5C:
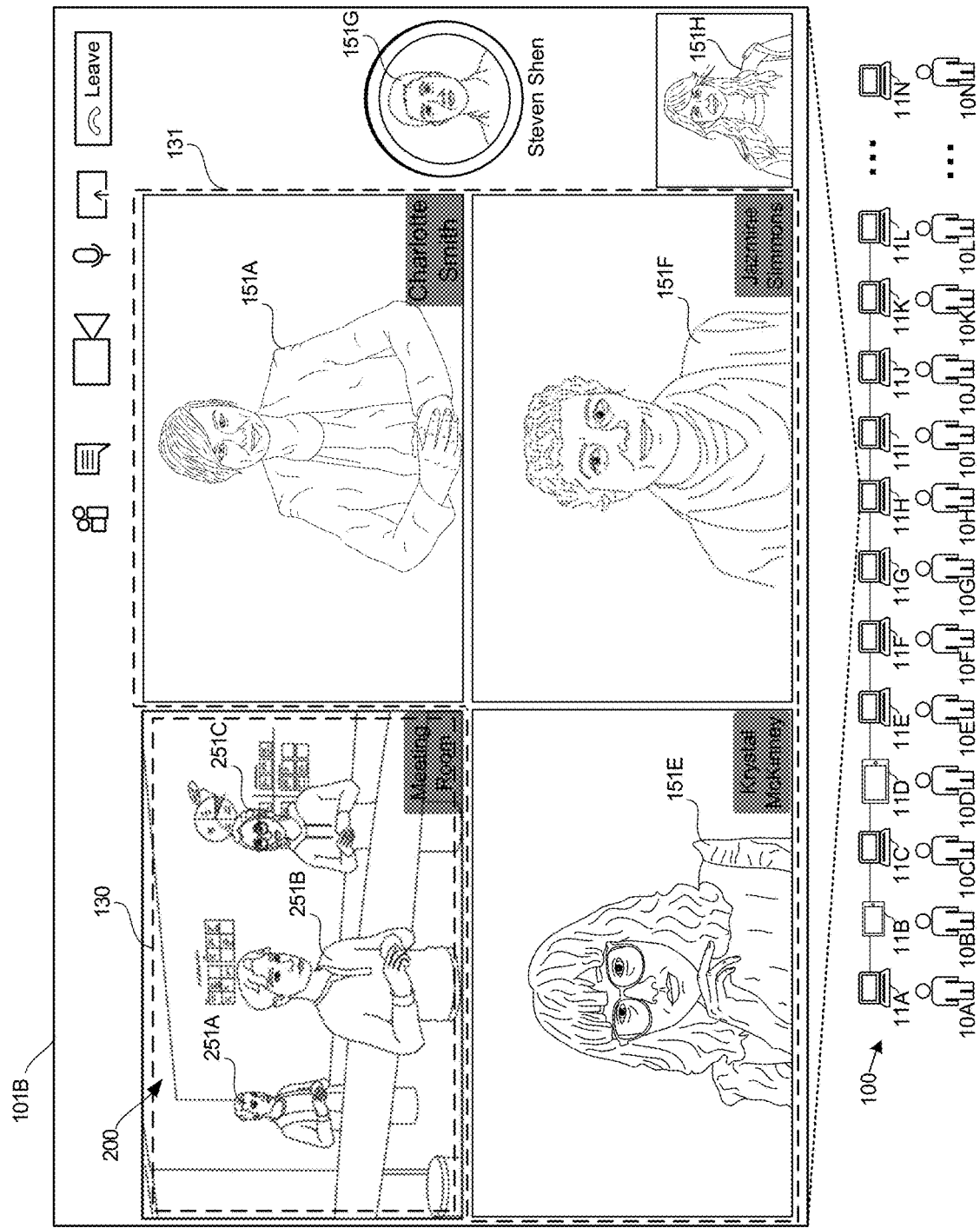
FIG. 5C illustrates a second user interface arrangement showing a rendering of virtual environment showing representations of several in-room participants with the addition of a second image of a user that is selected using an input, the second image being a live video stream positioned in a region reserved for active speakers.

FIG. 5A-5C illustrates other embodiments that can trigger a user interface transition based on a user input selecting a rendered attendee from a group image and/or the detection of an active speaker from the attendees depicted in the group image. In addition, these embodiments involve user interface arrangements having regions that are reserved for active users, e.g., people who are speaking with a threshold volume level, or speaking at another threshold unit of measure.

In one example, the user interface shown in FIG. 5A illustrates a user interface arrangement 101A that has a number of renderings of each user 10 in two regions: a first region 130 that is designated for a rendering of 3D representations of users positioned within a 3D environment 200 and a second region 131 that is designated for active speakers. In this embodiment, the second region 131 designated for active speakers is in association with a grid of 2D renderings of images that can be static images or dynamic video streams. Although this example illustrates an embodiment that has a rendering of a 3D environment in the first region 130, it can be appreciated that the first region 130 can also include a live video stream that is generated from a conference room camera, such as the camera shown in FIG. 1.

A second rendering of a user can be displayed based on one or more predetermined actions. For example, as shown in FIG. 5B, a predetermined action can include a user input indicating a selection of a user. This type of predetermined action can trigger a UI transition so that a second rendering of the selected user is displayed within the user interface concurrently with the group image. In another example, a predetermined action can include an input of a user that is talking. This type of predetermined action can trigger a UI transition so that a second rendering of the user who is talking is displayed within the user interface concurrently with the group image. In yet another example, a predetermined action can include a user input indicating a selection of a user that is talking. This type of predetermined action can trigger a UI transition so that a second rendering of the selected user who is also that is talking is displayed within the user interface concurrently with the group image. In this third embodiment, if a person in the group image is not talking, as a filtering mechanism, a selection of that person who is not talking, or at least talking at a threshold level, does not cause, or can restrict, a transition the user interface as described herein. A speech input that qualifies as a threshold level input for transitioning a UI can include any unit of measure for a speech input, including but not limited to, a speech input having a volume up to or exceeding a volume threshold, a speech input having a spoken word count up to or exceeding a word count threshold, a speech input having a spoken word rate, e.g., words per within a unit of time, up to or exceeding a word rate threshold, etc.

The system can select individual renderings of users for the second region 131 who are selected by a user input and/or actively speaking within a communication session. The system can use one or more thresholds or criteria for selecting individual users to be displayed within the second region 131 that is designated for active speakers. For instance, when the system detects that a user produces an audio signal from a microphone, the system can display a rendering of that user within the second region 131. In another example, the system can detect keyboard inputs or other forms of communication that can control the rendering of an avatar. If an input, such as a keyboard input for a chat, controls an avatar to give the appearance that the avatar is speaking, the system can display a second rendering of that user within the second region 131. The system can use criteria such as a rate of speech, a threshold number of words or characters, or a threshold volume level to select a user to determine if an input qualifies as a triggering input that invokes the UI transitions described herein.

For instance, if a user provides a number of keyboard or touch screen inputs to control an avatar or to provide text that may be converted to speech, and the keyboard inputs include a threshold number of words or a threshold speech rate, the system can display an image, or a supplemental image, of that user within the second region 131. The system can also analyze an audio signal to determine a rate of speech or determine if a user has provided a threshold number of words in a speech input. If the rate of speech or a number of words spoken by a user meets one or more criteria or exceeds one or more thresholds, the system can display a rendering of that user within the second region 131. Users who have speech activity that does not meet one or more criteria or does not exceed one or more thresholds, the system does not display their image in the second region 131.

The second region 131 can also have a predetermined limit of users that can be displayed. In such embodiments, users that are engaging in speech activity are ranked according to their activity. For instance, users that are speaking in a communication session may be ranked in a speaker queue based on a speech rate, a volume, the use of select words or terms, etc. The highest rank speakers, up to the predetermined limit, can be displayed within the second region 131. Once the input of those displayed speakers does not meet the criteria, the image of that active speaker may be removed.

The first user interface arrangement 101A of FIG. 5A can include two-dimensional (2D) images 151 of some users, which can include a still image or live video feed of a user. The first user interface arrangement 101A can also include renderings of the 3D representations 251, which can include avatars positioned within a 3D virtual environment 200. In this particular example, the first user interface arrangement 101A includes a rendering of a 3D representative 151A of the first user 10A, a rendering of a 3D representative 251B of the second user 10B, and a rendering of a 3D representative 251C of the third user 10C. The first user interface arrangement 101A also includes a rendering of a 2D image 151D of the fourth user 10D, a rendering of a 2D image 151E of the fifth user 10E, a rendering of a 2D image 151F of the sixth user 10F. For illustrative purposes, this first user interface arrangement 101A is displayed on the eighth computer of the eighth user 10H. Thus, the rendering of a 2D image 151H of the eighth user 10H is a display of the local user e.g., a "me" video.

While displaying the first user interface arrangement 101A, the system monitors the activity of the users who are displayed within a 3D environment. To preserve computing resources, in some configurations, the system can limit the monitoring activity to the audio streams of the users who are displayed as 3D representations 251 in the 3D environment. This allows the system to only run the voice analysis on the streams of certain users. The system also monitors input devices of any computer to detect the selection of any of the who are displayed the first region 130.

In response to determining that a particular user, e.g., User A depicted as representation 251A, who has a 3D representation displayed in a 3D environment, has a speech input that meets one or more criteria, or in response to determining that a user has provide an input indicating a selection of that particular user, the system executes a transition from the first user interface arrangement 101A of FIG. 5A to the second user interface arrangement 101B of FIG. 5C. As shown, in the transition, the system adds a second additional rendering of an image 151A or 3D representation of the particular user in the second user interface arrangement 101B. In some embodiments, the second image of the active speaker is displayed within the second region 131 that is reserved for active speakers and selected attendees.

In this example, the second region 131 that is reserved for active speakers and selected attendees is in a grid format where each section of the grid shows video renderings of participants. This region can be limited to a predetermined number of participants as described herein. The second user interface arrangement 101B is also configured with the 2D image 151A of the first user 10A such that it is concurrently displayed with the rendering of the 3D representation 251A of the first user 10A. In some embodiments, the rendering of the 3D representation 251A of the first user 10A can be maintained such that the first display region 130 shows the same viewing perspective of the 3D environment 200 throughout the transition.

The second rendering of an image or representation of the active speaker, also referred to herein as a "supplemental image" or a "second image," can be removed based on one or more factors. In some embodiments, the supplemental image can displayed for a predetermined period of time. After the predetermined period of time, the supplemental image, e.g., the 2D image 151A of the first user 10A, can be removed and replaced with another active speaker in a speaker queue. In some embodiments, the supplemental image can be displayed until one or more criteria of the speech input is no longer met. For instance, if the one or more criteria of the speech input includes a rate of speech, and a second image of a user that provides that speech input is displayed within the second region 131 in response to a speech input that meets or exceeds that rate of speech, the system can remove the second image of that user once that user stop speaking for a predetermined period of time. The second additional rendering can also be removed when a user provides another supplemental input selecting the first user 10A, e.g., a selection of that user in the first region or the second region.

In another example, if a second image, e.g., image 151A of FIG. 5B, of a user that provides a speech input is displayed within the second region 131 in response to a speech input that meets one or more criteria, the system can remove the second image of that user once that user stop speaking, or their speech input no longer meets the one or more criteria. In other embodiments, the system can remove the second image of that user once that user stop speaking for a predetermined period of time. The system can remove the second image of that user based on other factors. For instance, if other users speak at a louder volume than a user who is displayed in the second region, images of those other users may replace the second image of the user. These examples are provided for illustrative purposes and are not to be construed as limiting. It can be appreciated that any type of predetermined input metric related to any quantity of words, quantity of sentences, quantity of phrases, or any rate of input can be used to determine when a second image of a user is to be displayed and/or removed.

Figure 6A:
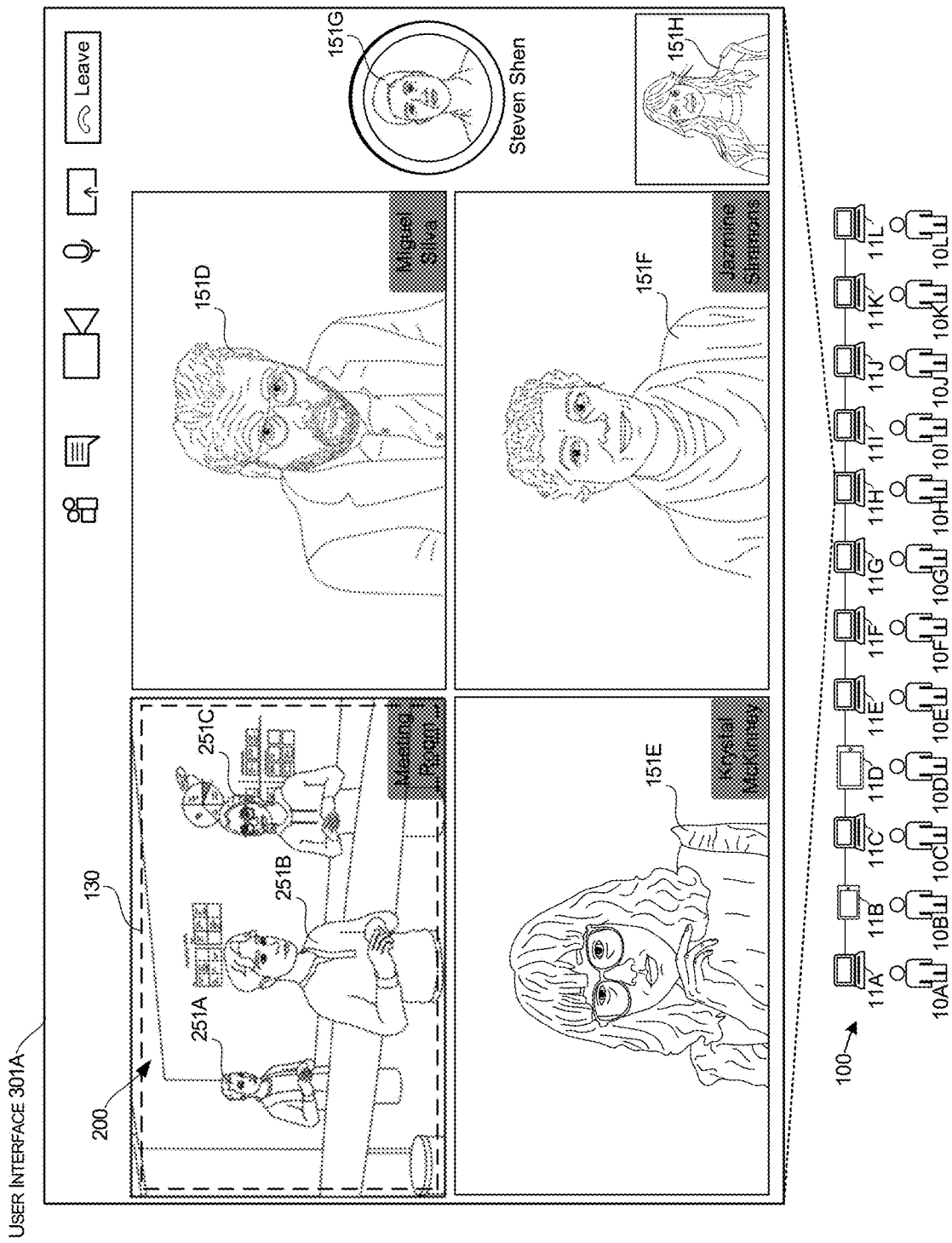
FIG. 6A illustrates a user interface arrangement that provides a rendering of virtual environment showing representations of several in-room participants of a meeting, the virtual environment being depicted with live video streams of other users.

FIGS. 6A-6C illustrates another example of a user interface transition that may occur when a triggering input is received. This example is similar to the above-described example in that a first user interface, as shown in FIG. 6A, shows a group image, which may be displayed with other images 151. As shown in FIG. 6B, when the first user 10A provides a triggering input, or another user selects the first user 10A, the system responds and displays a second image of that user is displayed within a second region 131 reserved for active speakers and selected attendees. In this embodiment, the second region 131 reserved for active speakers and selected attendees is positioned and arranged to overlap, at least partially, with the 3D rendering of the 3D environment 200. In this embodiment, the first region 130, which is reserved for a rendering of 3D representations of users positioned within the group image, which can be rendering of a 3D environment 200, and the second region 131 are arranged to, at least partially, overlap.

As shown in FIGS. 6A and 6B, the first user interface arrangement 301A shows a rendering of a 3D representation of the first user 10A displayed within a rendering of a 3D environment. When the first user 10A starts to provide a speech input or an input selecting the first user is received, as shown in FIG. 6B, the system then displays the second UI arrangement 301B shown in FIG. 6C. The second UI arrangement 301B shown in FIG. 6C includes a supplemental image 151A of that user, e.g., User A, within the second region 131. In some embodiments, the second user interface arrangement comprises a region 131 reserved for renderings of participants that provide a speech input that qualifies as a threshold level input. The position of the region tracks a position of a rendering of the at least one participant that is within the rendering 151A of a first image data 634A. The renderings of the separate video streams for each of the at least one participant are positioned within the region in response to determining that the at least one participant provides a speech input that qualifies as the threshold level input. This means that when the person's image, whether it involves a video stream or a virtual environment, moves within the rendering of the meeting room, the region 131 moves with that person's image.

Figure 7B:
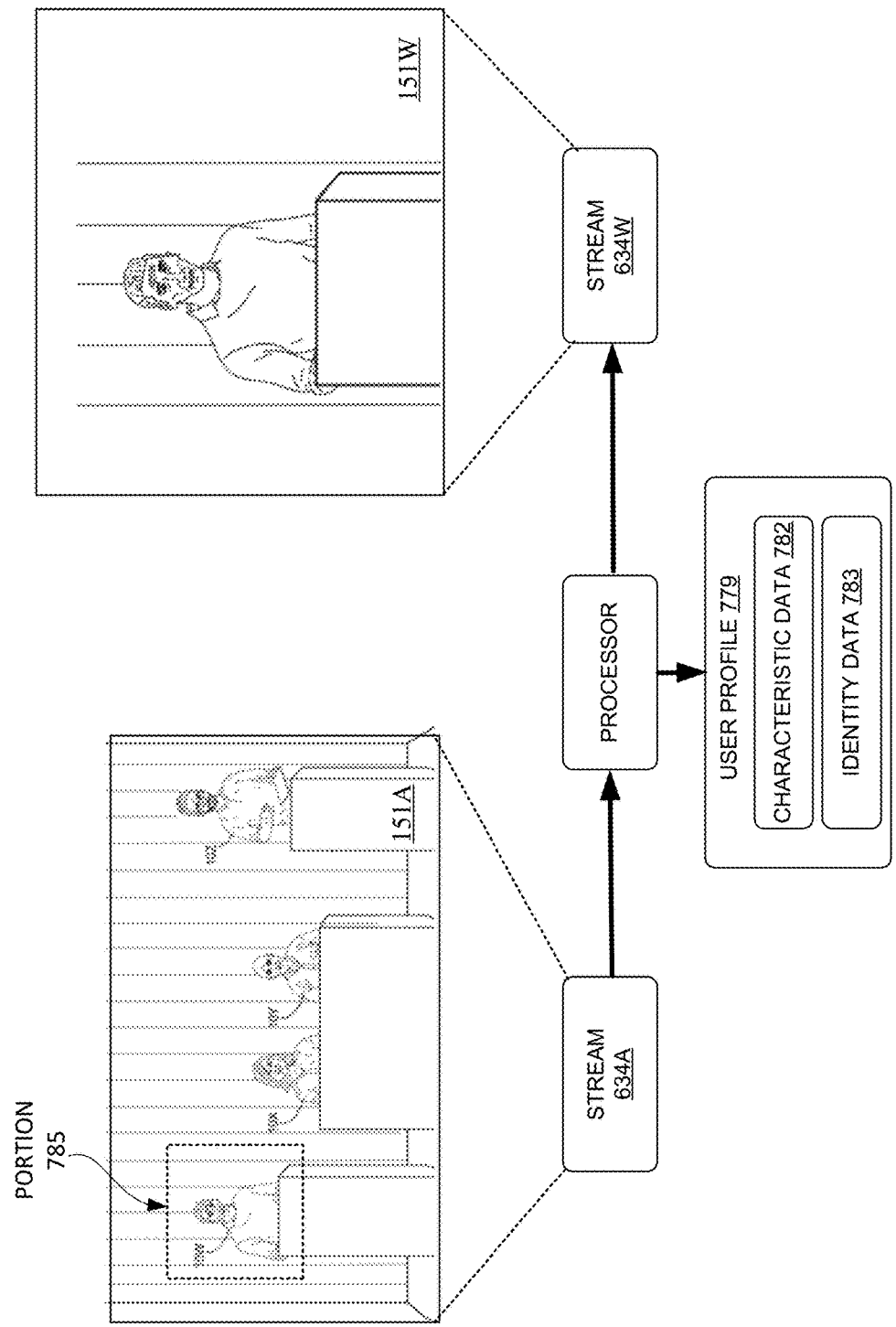
FIG. 7B illustrates how the system can generate focused streams from a stream of video data depicting multiple people.

FIGS. 7A-7C illustrates aspects of a system that can control the user interface transitions described herein. FIG. 7A shows additional aspects of a system configured to implement the techniques disclosed herein is shown and described below. For illustrative purposes, a rendering of a 2D image file or a rendering of a 2D image of a user can be generated by a 2D rendering engine 551 receiving 2D image data 310, e.g., an image file. A rendering of a 2D image file can include a 2D environment, e.g., the background of an image, and a 2D object, e.g., an image of a person or an avatar. The image file, e.g., 2D image data 310, can have pixels arranged in two dimensions, e.g., pixels arranged within a two-dimensional coordinate system (x, y). This data can also be referred to herein as a two-dimensional model that is based on a two-dimensional coordinate system. Each part of an image can be a pixel or any other geometric shape, such as a triangle. For instance, a group of pixels or triangles can be used to generate a rendering of a two-dimensional avatar of a user, or a live video image of a person.

A two-dimensional environment having a number of 2D images of participants of a communication session is also referred to herein as a "grid environment." 2D image data or a communication data stream can define a two-dimensional environment or a two-dimensional object, and that two-dimensional environment can be rendered on a display screen. The rendering can be referred to herein as a two-dimensional rendering of a two-dimensional environment or a two-dimensional rendering of a two-dimensional object. This is also referred to herein as a "rendering of the two-dimensional image."

For illustrative purposes, a rendering of a 3D model or a rendering of a 3D representation of the user can be generated by a 3D rendering engine 552 accessing 3D model data 320, e.g., a 3D model. A 3D model can include parameters defining a 3D environment 200, e.g., a model of a room, and parameters defining 3D objects, e.g., size, shape, and position data for representations 351 of users or other virtual objects. A three-dimensional environment is a computing environment model that is based on a three-dimensional coordinate system. Attributes of the three-dimensional environment and three-dimensional objects in the three-dimensional environment are based on components that are positioned within a three-dimensional coordinate system (x, y, z). Each component can be a triangle or any other geometric shape. Each of the components can have a position, e.g., a location in the three-dimensional coordinate system, as well as an orientation, e.g., a direction in which a triangle is pointed. For instance, a group of triangles can be used to generate a rendering of a three-dimensional avatar of a user or a three-dimensional rendering of a three-dimensional object.

A three-dimensional environment is also referred to herein as an "immersive environment." Model data or a three-dimensional model can be included in a communication data stream and the model data can define a three-dimensional environment. That three-dimensional environment can be based on a three-dimensional coordinate system. When the rendering engine 552 generates a 3D rendering from a 3D model, that rendering is generated from a reference point in the environment, e.g., a perspective having a position relative to the virtual environment. for illustrative purposes, a reference point is also referred to herein as a virtual camera 350. That camera can have a field of view which is used to generate a rendering of a 3D environment or a 3D object based on the position of the virtual camera 350. The rendering of a three-dimensional object in the three-dimensional environment is based on a position and orientation of the three-dimensional object and the position of the virtual camera 350.

In some embodiments, two-dimensional images can be displayed within a three-dimensional environment. This can occur, for instance, when a communication system receives a two-dimensional video stream of a user, but participants receiving that video stream are viewing a 3D environment with HMDs. This may cause the system to show the image of that user on as if they are appearing on a virtual television on the wall of the virtual environment. This is referred to herein as a two-dimensional rendering of a user within a three-dimensional environment.

In some embodiments, a three-dimensional environment and three-dimensional objects defined by a three-dimensional model can be displayed as a two-dimensional rendering. This can occur, for instance, when a communication session involves a user interface that shows two-dimensional images, e.g., when Teams is in Grid Mode. While in this mode, the system may need to display images of users interacting in a 3D environment. In this instance, a 2D image of the 3D environment is displayed from a particular position, e.g., a virtual camera position, and that 2D image is displayed within one of the grids. This rendering can be referred to herein as a two-dimensional rendering of a three-dimensional environment. To achieve a two-dimensional rendering of a three-dimensional environment, model data defining a three-dimensional environment can be projected using a transform. The transform can generate the rendering such that the width, height, and depth of a three-dimensional object can be expressed on a flat screen using vector projections from a model of the object to a point of view, e.g., a virtual camera position.

FIG. 7A also shows a data structure that can be utilized to associate regions of a user interface with particular users. For instance, in the rendering of the 3D model, a first region may be associated with the first user. Thus, if any input is received within that first region, that first user is identified. Using the identification information, the system can generate a second image of that user within a user interface.

The data structure associating regions of a user interface with particular users can be utilized to retrieve other information and to generate streams. For instance, in FIG. 7B, in response to a selection of a participant, Participant 10W, a processor of the system can generate a new image stream 634W depicting a selected user 10W from an original stream 634A that depicts a group of individuals 10W, 10X, 10Y, 10Z. Those streams can be respectively used to generate a first rendering 151A of the group and a second additional rendering 151A of the selected person.

As shown in FIG. 7B, a new video stream 634W depicting a single person 10W can be generated by processing an original stream 634A depicting a number of people 10W-10Z. This processing can occur in response to the input indicating the selection of the at least one participant 10W of the set of participants 10W-10Z depicted in a first image data 634A captured by a camera 120. One or more processors can generate a separate video stream 634W for each of the at least one participant 10W of the set of participants 10W-10Z by extracting at least one portion 781 of the first image data 634A for each of the at least one participant 10W. Each portion of the first image data 634A can depict individuals of the at least one participant, such as User 10W, as shown. As shown in FIG. 7C, the system can process an original stream 634A to generate multiple output streams that can each depict respective portions 785A and 785B of the original stream. The output streams can also be processed to give the appearance that a rendering of the output streams 634W and 634X provide an enlarged or zoomed image of the selected users, 10W and 10X. Any technology for performing a digital zoom on a video stream can be used to generate the focused streams 634X or 634W from the original stream 634A.

Referring again to FIG. 7B, the system can also identify each of the selected users. This can include accessing a data resource or a database that stores one or more user profiles 779. Each user profile can store information such as characteristic data 782, which can include facial features or other physical characteristics of a user. The user profile can also include other identity information such as identity data 783 that includes a name title or system identities. Thus, when a system receives an original stream, also referred to herein as "first image data," the system can analyze the first image data depicting the set of participants to identify physical characteristics for each of the individual participants. The system can then select one or more user profiles from a number of profiles for identifying one or more user identities for one or more participants of the set of participants. The selection can be based on determining a threshold match between physical characteristics data stored in association with the one or more user profiles and the physical characteristics determined from the analysis of the first image data. The system can then communicate the identities of the at least one participant of the set of participants to the one or more computing devices for display of the identities of the at least one participant in the second user interface arrangement. This includes displaying an identified user's name on their second rendering, such as Charlotte Smith of rendering 151A shown in FIG. 5C.

Figure 8:
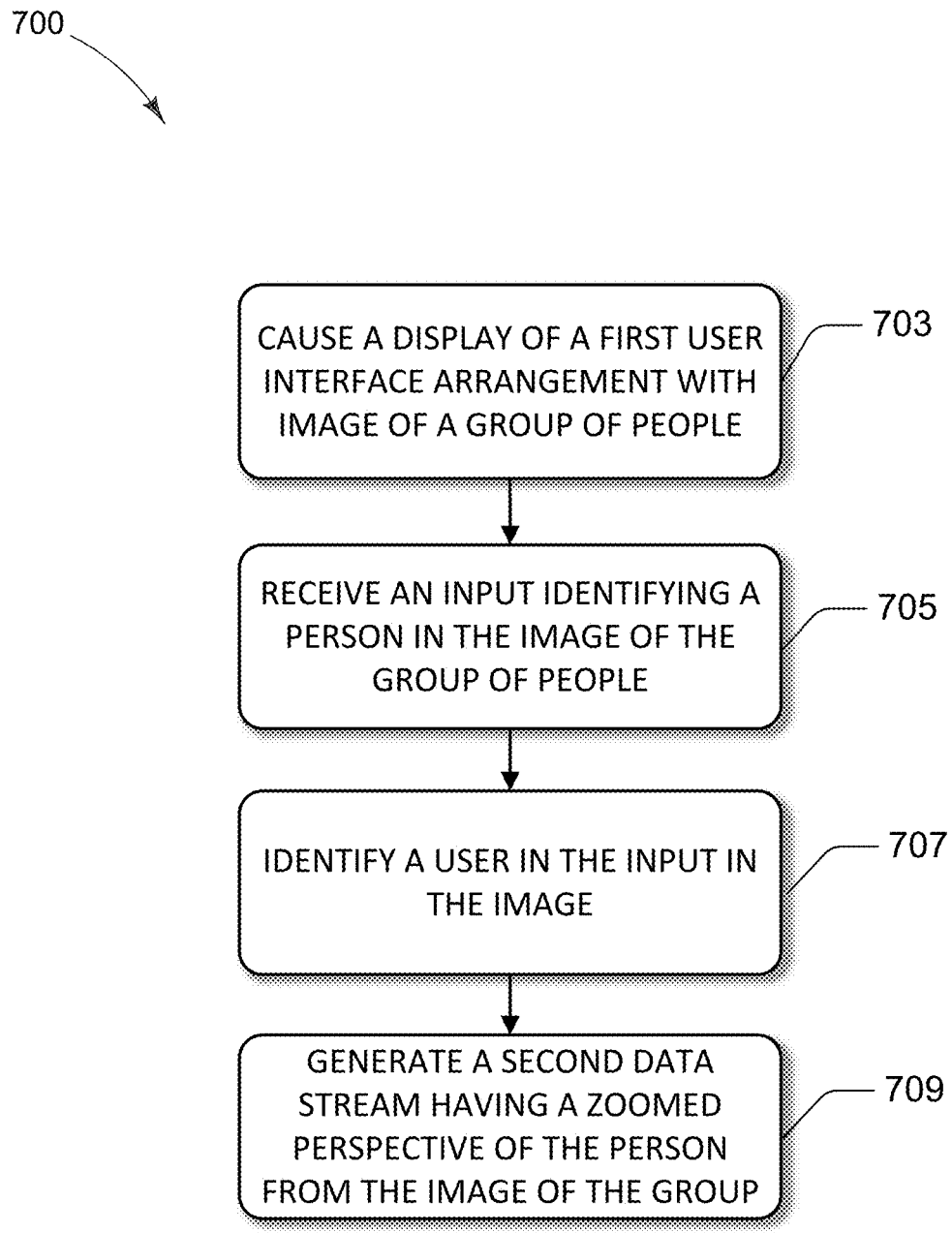
FIG. 8 is a flow diagram showing aspects of a routine for controlling the display of visual indicators to show active speakers of a communication session who are displayed as 3D representations.

FIG. 8 is a diagram illustrating aspects of a routine 700 for providing customized user interfaces displaying an image of multiple participants in a hybrid communication session. It should be understood by those of ordinary skill in the art that the operations of the methods disclosed herein are not necessarily presented in any particular order and that performance of some or all of the operations in an alternative order is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can start or end at any time and need not be performed in their entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a system, e.g., one or more computing devices, it can be appreciated that this routine can be performed on any computing system which may include any number of computers working in concert to perform the operations disclosed herein.

Thus, it should be appreciated that the logical operations described herein are implemented as a sequence of computer implemented acts or program modules running on a computing system such as those described herein and/or as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 7 and the other FIGURES can be implemented in association with the example user interfaces and systems described herein. For instance, the various devices and/or modules described herein can generate, transmit, receive, and/or display data associated with content of a communication session e.g., live content, broadcasted event, recorded content, etc. and/or a presentation UI that includes renderings of one or more participants of remote computing devices, avatars, channels, chat sessions, video streams, images, virtual objects, and/or applications associated with a communication session.

The routine 700 includes an operation 703 where the system causes a display of a first user interface arrangement with an image of a group of people. As shown in FIG. 2A, a first user interface arrangement can include a rendering of a number of people position in front of a conference room camera. This can be displayed along with other renderings of other users in 2D format or 3D format.

At operation 705, the system receives an input identifying an attendee depicted in the group image. This can include an input such as a voice command, a pointer device input, an input gesture or any other input that indicates a selection of a person depicted in the group image. The selection can also come from an input from a person depicted in the group image. For instance, if a person performs a specific gesture or provides a speech input that meets one or more criteria, the system can cause a transition of user interface arrangements based on this type of input. The input can also include an automated action caused by a computing device. For example, the input can include a process where a computer performs an automated recognition of a speaker in a conference room setting. The input can include a process where a computer performs an automated recognition of video or audio selection of a person, such as a speaker to be mapped into a separate video stream. Thus, when the system detects that a person in depicted in the first image of the group video starts to talk, the system can identify that person based on an audio signal received from their computer. In response to this detection, the system can select the portion of the video stream depicting that person and use that portion of the video to create a zoomed rendering of that person in a new region of the user interface.

In operation 705 or as a part of any other operation, the system can modify permissions of the at least one participant in response to an input that identifies the at least one participant. For instance, in response to the input indicating the selection of the at least one participant 10W/10X of the subset of participants 10W-10Z depicted in the first image data 634A, the system can modify permissions of the at least one participant from a first operating state that restricted the at least one participant from sharing content to a second operating state that allows the at least one participant to sharing content with one or more participants, wherein sharing content comprises sending content of a file to one or more devices or causing a display of the content of the file on the one or more devices. This means that a person can be promoted to a presenter status and receive permissions to share files in response to a single input.

At operation 707, the system can identify a user that was selected in the input. In this operation, the system can analyze the group image to determine one or more physical characteristics of the user that was selected in the input. This can include facial features or other physical characteristics. The system can compare those physical characteristics identified from the group image with physical characteristics defined in the user profile. Once the system finds a threshold match between the physical characteristics identified from the group image and the physical characteristics defined in the profile, the system can select that profile and extract the user's identity or other information.

In operation 709, the System can then transition the user interface arrangements from the first user interface arrangement to a second user interface arrangement that includes a second additional image of the selected user. In some configurations, the second additional image of the selected user can provide a zoomed perspective to provide more detail when displayed.

The operations of the routine can enable a user to make one or more selections of attendees from a video stream that includes multiple attendees (such as the scene of a conference room or a camera focusing on a group of audience). In response to each selection, the conference system identifies and extracts each of the selected attendee(s) from the video stream of the conference room; and displays additional "tiles" in the meeting UI for each respective selected attendee(s). FIGS. 1, 2A-2C, 3A-3C: system starts with a rendering of a specific group, then generates separate focused videos that are extracted from the original group video. A computer-implemented method for customizing a user interface (101) by generating at least one additional rendering that brings focus to at least one participant (10W/10X) of a subset of participants (10W-10Z) that are depicted in a rendering (151A) displayed for a communication session (604) of a plurality of participants (10A-10Z), the computer-implemented method configured for execution on a computing system (100) comprising: As shown in FIG. 2A/3A, the system can display a video stream that includes multiple attendees (such as the scene of a conference room or a camera focusing on a group of audience, as shown in FIG. 1), this includes operations that cause a display of a first user interface arrangement (101A) on display devices of one or more computing devices (11A-11Z), the user interface (101) comprising a rendering (151A) of a first image data (634A) depicting the subset of participants (10W-10Z) that are positioned within a field of view of a camera (120) generating the first image data (634A); then as shown in FIG. 2B or 3B, the system can allow a user to make one or more selections of attendees from a video stream that includes multiple attendees, this can include operations that cause a system to receive an input from the one or more computing devices (11A-11Z), the input indicating a selection of the at least one participant (10W/10X) of the subset of participants (10W-10Z) depicted in the first image data (634A), this can involve a speech input of the at least one participant (10W/10X) or a user selection input of another user, then the system can identify each of the selected users and extract each of the selected attendee(s) from the video stream of the conference room, this can include operations where, in response to the input indicating the selection of the at least one participant (10W/10X) of the subset of participants (10W-10Z) depicted in the first image data (634A), generating separate video streams (634W/634X) for each of the at least one participant (10W/10X) of the subset of participants (10W-10Z) by extracting at least one portion (785 of FIG. 7B/7C) of the first image data (634A) for each of the at least one participant (10W/10X), wherein each portion of the first image data (634A) depicts an individual of the at least one participant (10W/10X); and as shown in FIGS. 2C and 3C, the system can cause a user interface transition that ultimately shows a second additional rendering of each selected person, this can include operations that cause a transition from the first user interface arrangement (101A) to a second user interface arrangement (101B), wherein the first user interface arrangement (101A) comprises the rendering (151A) of the first image data (634A) depicting the subset of participants (10W-10Z) without additional renderings of the separate video streams (634W/634X) for each of the at least one participant (10W/10X), and wherein the second user interface arrangement (101B) comprises the rendering (151A) of the first image data (634A) depicting the subset of participants (10W-10Z) concurrently with the renderings of the separate video streams (634W/634X) for each of the at least one participant (10W/10X).

The method can also display additional "tiles" in the meeting UI for each respective selected attendee(s), this can include operations for modifying the second user interface arrangement to include a new region of a grid layout for each of the renderings of the separate video streams.

The method can also identify each of the selected users. System retrieves user identities and then displays names or user IDs. The method further comprises: analyzing the first image data depicting the set of participants to identify physical characteristics for each of the individual participants; selecting one or more user profiles for identifying one or more user identities for one or more participants of the set of participants, the selection being based on determining a threshold match between physical characteristics data stored in association with the one or more user profiles and the physical characteristics determined from the analysis of the first image data; and communicating the identities of the at least one participant of the set of participants to the one or more computing devices for display of the identities of the at least one participant in the second user interface arrangement.

As shown in FIGS. 2D and 2E, the method can also include the selection of additional users creates additional tiles, wherein the input is a first input, wherein the method further comprises: receiving a second input the one or more computing devices, the second input indicating a selection of at least one additional participant of the subset of participants depicted in the first image data; in response to the input indicating the selection of the at least one additional participant of the subset of participants depicted in the first image data, generating additional separate video streams for each of the at least one additional participant by extracting at least one other portion of the first image data for each of the at least one additional participant, wherein the at least one other portion of the first image data depicts an individual of the at least one additional participant; and causing a transition from the second user interface arrangement to a third first user interface arrangement, wherein the third user interface arrangement comprises the rendering of the first image data depicting the set of participants concurrently with the additional rendering of the at least one participant displayed in response to a first input, and another additional rendering of the at least one additional participant displayed in response to the second input.

As shown in FIG. 5C, the method can include regions reserved for active speakers or users that are selected by an input, the second user interface arrangement comprises a region reserved for renderings of participants that provide a speech input that qualifies as a threshold level input, wherein the renderings of the separate video streams for each of the at least one participant are positioned within the region in response to determining that the at least one participant provides a speech input that qualifies as the threshold level input.

As shown in FIG. 6C, regions of the UI can be reserved for active speakers or users that are selected by an input, the second user interface arrangement comprises a region reserved for renderings of participants that provide a speech input that qualifies as a threshold level input, wherein a position of the region tracks a position of a rendering of the at least one participant that is within the rendering (151A) of a first image data (634A), wherein the renderings of the separate video streams for each of the at least one participant are positioned within the region in response to determining that the at least one participant provides a speech input that qualifies as the threshold level input.

The method can include an input where a selection of a user changes permissions for accessing content, e.g., selection of a person can promote them to a presenter status. The method can further comprise, in response to the input indicating the selection of the at least one participant of the subset of participants depicted in the first image data, modifying permissions of the at least one participant from a first operating state that restricted the at least one participant from sharing content to a second operating state that allows the at least one participant to sharing content with one or more participants, wherein sharing content comprises sending content of a file to one or more devices or causing a display of the content of the file on the one or more devices.

Figure 9:
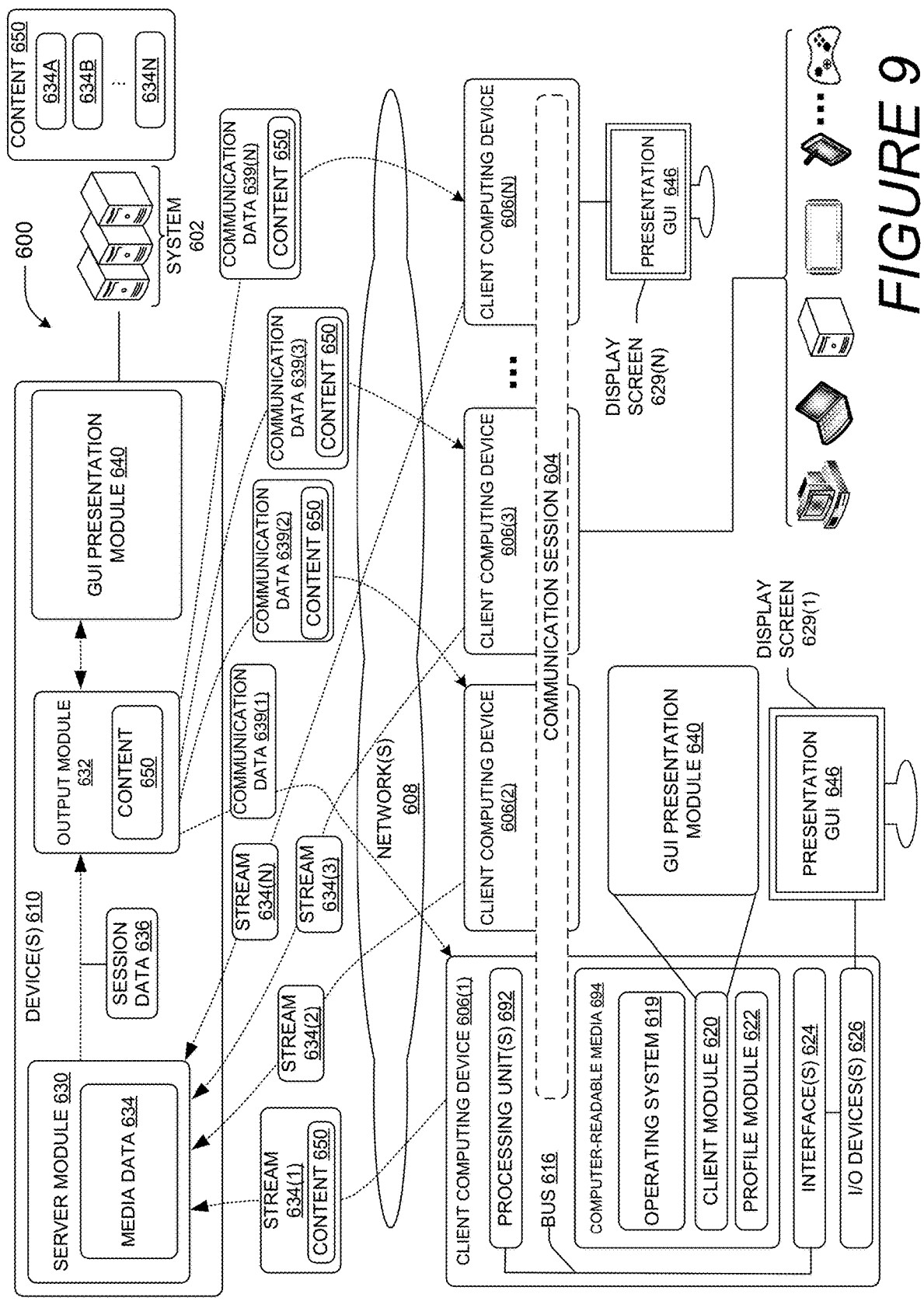
FIG. 9 is a computer architecture diagram illustrating an illustrative computer hardware and software architecture for a computing system capable of implementing aspects of the techniques and technologies presented herein.

FIG. 9 is a diagram illustrating an example environment 600 in which a system 602 can implement the techniques disclosed herein. It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

In some implementations, a system 602 may function to collect, analyze, and share data that is displayed to users of a communication session 604. As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations.

In examples described herein, client computing devices 606(1) through 606(N) participating in the communication session 603 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 603 live as activity occurs, or alternatively, via a recording at a later time after the activity occurs. In the examples described herein, client computing devices 606(1) through 606(N) participating in the communication session 603 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 602 of FIG. 9 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses.

Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device (s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 8 illustrates that client computing device 606(1) is in some way connected to a display device (e.g., a display screen 629(N)), which can display a UI according to the techniques described herein.

In the example environment 600 of FIG. 9, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network (s) 608.

The client computing device(s) 606(1) through 606(N) may use their respective profile modules 622 to generate participant profiles (not shown in FIG. 9) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 9, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening", device such that it only receives content associated with the communication session 603 but does not provide any content to the communication session 603. The media streams 634 can also be included in the content 650 that is sent to the clients. A first media stream 634(1) can be processed to be sent to any client as a first data stream 634A, a second media stream 634(2) can be processed to be sent to any client as a second data stream 634B, etc. The first data stream 634A can depict one set of individuals, which can include an individual or a first group of people, and the second data stream 634B can depict a second set of individuals, which can include another individual or a second group of people. Thus, content 650 that is sent to each client can include media streams that are from each computing device. This enables each client to display any combination of streams or image of each participant of a communication session. The image streams 634 are also referred to herein as media streams 634, image data 634, image streams 634, or video streams 634.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such as an image file, a spreadsheet file, a slide deck, a document, etc. The streams 634 can include a video component depicting images captured by an I/O device 626 on each client computer. The content 650 also include input data from each user, which can be used to control a direction and location of a representation. The content can also include instructions for sharing data and identifiers for recipients of the shared data. Thus, the content 650 is also referred to herein as "input data 650" or an "input 650."

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different from the general communication session.

Figure 10:
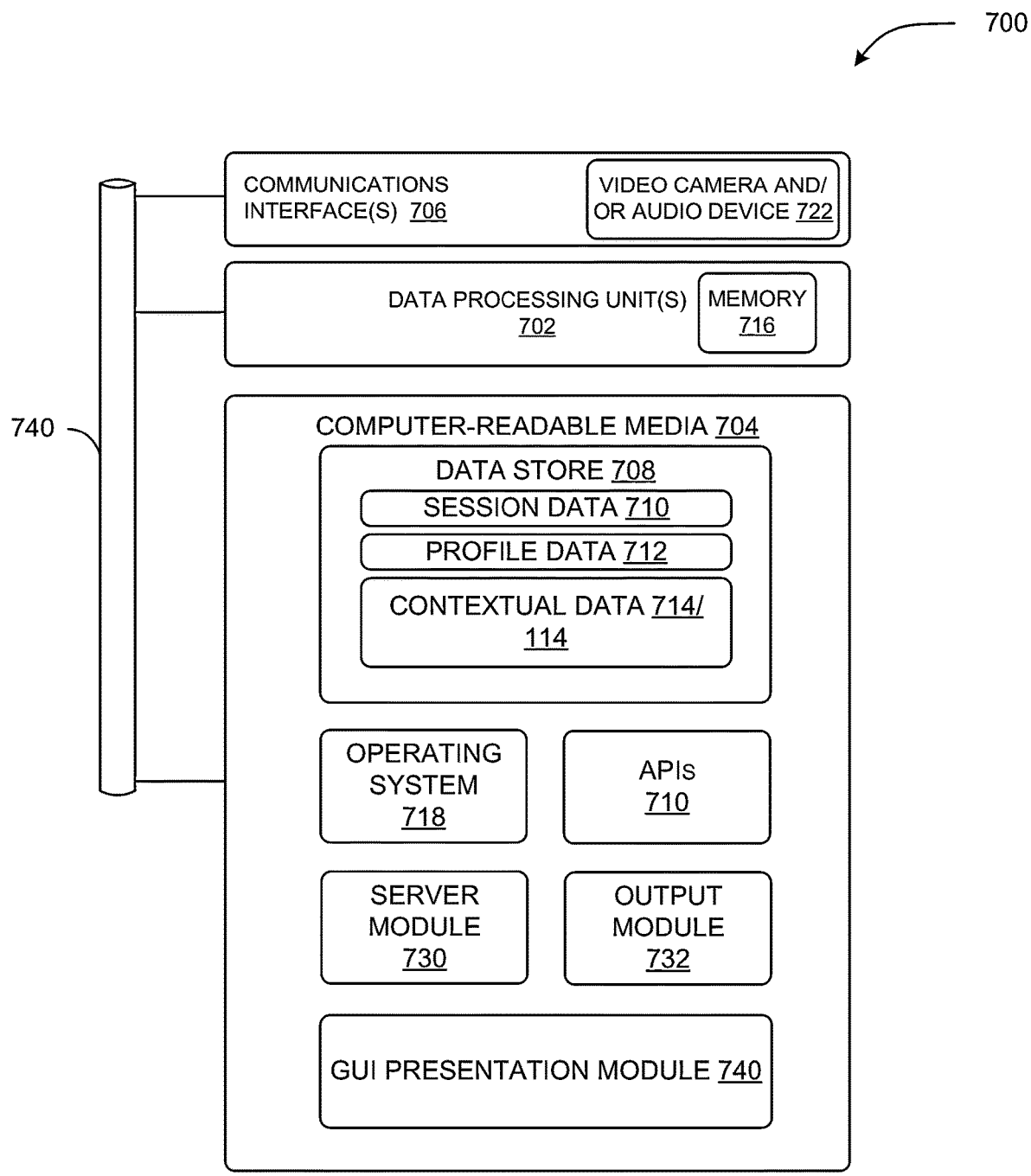
FIG. 10 is a computer architecture diagram illustrating a computing device architecture for a computing device capable of implementing aspects of the techniques and technologies presented herein.

FIG. 10 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 740, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The computer storage media can also be referred to herein as computer-readable storage media, non-transitory computer-readable storage media, non-transitory computer-readable medium, or computer storage medium.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store session data 710 (e.g., session data 636 as shown in FIG. 9), profile data 712 (e.g., associated with a participant profile), and/or other data. The session data 710 can include a total number of participants (e.g., users and/or client computing devices) in a communication session, activity that occurs in the communication session, a list of invitees to the communication session, and/or other data related to when and how the communication session is conducted or hosted. The data store 708 may also include contextual data 714, such as the content that includes video, audio, or other content for rendering and display on one or more of the display screens 629. Hardware data 711 can define aspects of any device, such as a number of display screens of a computer. The contextual data 714 can define any type of activity or status related to the individual users 10A-10L each associated with individual video streams of a plurality of video streams 634. For instance, the contextual data can define a person's level in an organization, how each person's level relates to the level of others, a performance level of a person, or any other activity or status information that can be used to determine a position for a rendering of a person within a virtual environment. This contextual information can also be fed into any of the models to help bring emphasis to keywords spoken by a person at a specific level, highlight a UI when a background sound of a person at a certain level is detected, or change a sentiment display in a particular way when a person at a certain level is detected has a certain sentiment.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 710 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary. That is, functionality described herein in association with the illustrated modules may be performed by a fewer number of modules or a larger number of modules on one device or spread across multiple devices.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

We claim:

1. A computer-implemented method for customizing a user interface by generating at least one additional rendering that brings focus to at least one participant of a subset of participants that are depicted in a rendering displayed for a communication session of a plurality of participants, the computer-implemented method configured for execution on a computing system comprising:

causing a display of a first user interface arrangement on display devices of one or more computing devices, the user interface comprising a rendering of a first image data depicting the subset of participants that are positioned within a field of view of a camera generating the first image data;

analyzing the first image data depicting the subset of participants to identify physical characteristics for individual participants of the subset of participants;

selecting one or more user profiles for identifying one or more user identities for one or more participants of the subset of participants, the selection being based on determining a threshold match between physical characteristics data stored in association with the one or more user profiles and the physical characteristics determined from the analysis of the first image data;

receiving an input gesture selecting the at least one participant from the subset of participants depicted in the first image data, the input gesture received from a user that is not the at least one participant selected from the subset of participants;

in response to the input gesture selecting the at least one participant from the subset of participants depicted in the first image data, the input gesture received from the user that is not the at least one participant selected from the subset of participants:

modifying permissions of the at least one participant from a first operating state that restricts the at least one participant from sharing content to a second operating state that allows the at least one participant to share the content with other participants of the plurality of participants, generating the separate video streams for each of the at least one participant of the subset of participants by extracting at least one portion of the first image data for each of the at least one participant, wherein each portion of the first image data depicts an individual of the at least one participant, and causing the user interface transition from the first user interface arrangement to a second user interface arrangement, wherein the first user interface arrangement comprises the rendering of the first image data depicting the subset of participants without additional renderings of the separate video streams for each of the at least one participant, and wherein the second user interface arrangement comprises the rendering of the first image data depicting the subset of participants concurrently with the renderings of the separate video streams for each of the at least one participant, wherein the separate video streams for each of the at least one participant is extracted from the first image data.

2. The method of claim 1, further comprising: modifying the second user interface arrangement to include a new region of a grid layout for each of the renderings of the separate video streams.

3. The method of claim 1, wherein the input is a first input, wherein the method further comprises:

receiving a second input from the one or more computing devices, the second input indicating a selection of at least one additional participant of the subset of participants depicted in the first image data;

in response to the input indicating the selection of the at least one additional participant of the subset of participants depicted in the first image data, generating additional separate video streams for each of the at least one additional participant by extracting at least one other portion of the first image data for each of the at least one additional participant, wherein the at least one other portion of the first image data depicts an individual of the at least one additional participant; and causing a transition from the second user interface arrangement to a third first user interface arrangement, wherein the third user interface arrangement comprises the rendering of the first image data depicting the set of participants concurrently with the additional rendering of the at least one participant displayed in response to a first input, and another additional rendering of the at least one additional participant displayed in response to the second input.

4. The method of claim 1, wherein the second user interface arrangement comprises a region reserved for renderings of participants that provide a speech input that qualifies as a threshold level input, wherein the renderings of the separate video streams for each of the at least one participant are positioned within the region in response to determining that the at least one participant provides a speech input that qualifies as the threshold level input.

5. The method of claim 1, wherein the second user interface arrangement comprises a region reserved for renderings of participants that provide a speech input that qualifies as a threshold level input, wherein a position of the region tracks a position of a rendering of the at least one participant that is within the rendering of a first image data, wherein the renderings of the separate video streams for each of the at least one participant are positioned within the region in response to determining that the at least one participant provides a speech input that qualifies as the threshold level input.

6. A system for customizing a user interface by generating at least one additional rendering that brings focus to at least one participant of a subset of participants that are depicted in a rendering displayed for a communication session of a plurality of participants, the system comprising:

one or more processing units; and a computer-readable storage medium having encoded thereon computer-executable instructions to cause the one or more processing units to:

cause a display of a first user interface arrangement on display devices of one or more computing devices, the user interface comprising a rendering of a first image data depicting the subset of participants that are positioned within a field of view of a camera generating the first image data;

analyze the first image data depicting the subset of participants to identify physical characteristics for individual participants of the subset of participants;

select one or more user profiles for identifying one or more user identities for one or more participants of the subset of participants, the selection being based on determining a threshold match between physical characteristics data stored in association with the one or more user profiles and the physical characteristics determined from the analysis of the first image data;

receive an input gesture selecting the at least one participant from the subset of participants depicted in the first image data, the input gesture received from a user that is not the at least one participant selected from the subset of participants;

in response to the input gesture selecting the at least one participant from the subset of participants depicted in the first image data, the input gesture received from the user that is not the at least one participant selected from the subset of participants:

modify permissions of the at least one participant from a first operating state that restricts the at least one participant from sharing content to a second operating state that allows the at least one participant to share the content with other participants of the plurality of participants, generate the separate video streams for each of the at least one participant of the subset of participants by extracting at least one portion of the first image data for each of the at least one participant, wherein each portion of the first image data depicts an individual of the at least one participant, and causing the user interface transition from the first user interface arrangement to a second user interface arrangement, wherein the first user interface arrangement comprises the rendering of the first image data depicting the subset of participants without additional renderings of the separate video streams for each of the at least one participant, and wherein the second user interface arrangement comprises the rendering of the first image data depicting the subset of participants concurrently with the renderings of the separate video streams for each of the at least one participant, wherein the separate video streams for each of the at least one participant is extracted from the first image data.

7. The system of claim 6, wherein the instructions further cause the one or more processing units to add a new cell of a grid arrangement for each rendering of the separate video streams.

8. The system of claim 6, wherein the input is a first input, wherein the instructions further cause the one or more processing units to:

receive a second input from the one or more computing devices, the second input indicating a selection of at least one additional participant of the subset of participants depicted in the first image data;

in response to the input indicating the selection of the at least one additional participant of the subset of participants depicted in the first image data, generate additional separate video streams for each of the at least one additional participant by extracting at least one other portion of the first image data for each of the at least one additional participant, wherein the at least one other portion of the first image data depicts an individual of the at least one additional participant; and cause a transition from the second user interface arrangement to a third first user interface arrangement, wherein the third user interface arrangement comprises the rendering of the first image data depicting the set of participants concurrently with the additional rendering of the at least one participant displayed in response to a first input, and another additional rendering of the at least one additional participant displayed in response to the second input.

9. The system of claim 6, wherein the second user interface arrangement comprises a region reserved for renderings of participants that provide a speech input that qualifies as a threshold level input, wherein a position of the region tracks a position of a rendering of the at least one participant that is within the rendering of a first image data, wherein the renderings of the separate video streams for each of the at least one participant are positioned within the region in response to determining that the at least one participant provides a speech input that qualifies as the threshold level input.

10. A computer-readable storage medium having encoded thereon computer-executable instructions to cause one or more processing units of a system to customize a user interface by generating at least one additional rendering that brings focus to at least one participant of a subset of participants that are depicted in a rendering displayed for a communication session of a plurality of participants, the instructions cause one or more processing units of the system to:

cause a display of a first user interface arrangement on display devices of one or more computing devices, the user interface comprising a rendering of a first image data depicting the subset of participants that are positioned within a field of view of a camera generating the first image data;

analyze the first image data depicting the subset of participants to identify physical characteristics for individual participants of the subset of participants;

select one or more user profiles for identifying one or more user identities for one or more participants of the subset of participants, the selection being based on determining a threshold match between physical characteristics data stored in association with the one or more user profiles and the physical characteristics determined from the analysis of the first image data;

receive an input gesture selecting the at least one participant from the subset of participants depicted in the first image data, the input gesture received from a user that is not the at least one participant selected from the subset of participants;

in response to the input gesture selecting the at least one participant from the subset of participants depicted in the first image data, the input gesture received from the user that is not the at least one participant selected from the subset of participants:

modify permissions of the at least one participant from a first operating state that restricts the at least one participant from sharing content to a second operating state that allows the at least one participant to share the content with other participants of the plurality of participants, generate the separate video streams for each of the at least one participant of the subset of participants by extracting at least one portion of the first image data for each of the at least one participant, wherein each portion of the first image data depicts an individual of the at least one participant, and causing the user interface transition from the first user interface arrangement to a second user interface arrangement, wherein the first user interface arrangement comprises the rendering of the first image data depicting the subset of participants without additional renderings of the separate video streams for each of the at least one participant, and wherein the second user interface arrangement comprises the rendering of the first image data depicting the subset of participants concurrently with the renderings of the separate video streams for each of the at least one participant, wherein the separate video streams for each of the at least one participant is extracted from the first image data.

11. The computer-readable storage medium of claim 10, wherein the instructions further cause the one or more processing units to add a new cell of a grid arrangement for each rendering of the separate video streams.

12. The computer-readable storage medium of claim 10, wherein the input is a first input, wherein the instructions further cause the one or more processing units to:

receive a second input from the one or more computing devices, the second input indicating a selection of at least one additional participant of the subset of participants depicted in the first image data;

in response to the input indicating the selection of the at least one additional participant of the subset of participants depicted in the first image data, generate additional separate video streams for each of the at least one additional participant by extracting at least one other portion of the first image data for each of the at least one additional participant, wherein the at least one other portion of the first image data depicts an individual of the at least one additional participant; and cause a transition from the second user interface arrangement to a third first user interface arrangement, wherein the third user interface arrangement comprises the rendering of the first image data depicting the set of participants concurrently with the additional rendering of the at least one participant displayed in response to a first input, and another additional rendering of the at least one additional participant displayed in response to the second input.

13. The computer-readable storage medium of claim 10, wherein the second user interface arrangement comprises a region reserved for renderings of participants that provide a speech input that qualifies as a threshold level input, wherein the renderings of the separate video streams for each of the at least one participant are positioned within the region in response to determining that the at least one participant provides a speech input that qualifies as the threshold level input.

14. The computer-readable storage medium of claim 10, wherein the second user interface arrangement comprises a region reserved for renderings of participants that provide a speech input that qualifies as a threshold level input, wherein a position of the region tracks a position of a rendering of the at least one participant that is within the rendering of a first image data, wherein the renderings of the separate video streams for each of the at least one participant are positioned within the region in response to determining that the at least one participant provides a speech input that qualifies as the threshold level input.

15. The computer-implemented method of claim 1, wherein the content is a file, while in the second operating state, the file is permitted to be communicated from a device of the at least one participant to other devices of the other participants of the communication session.

16. The computer-implemented method of claim 1, wherein the content is text content, while in the second operating state, the text content is permitted to be communicated from a device of the at least one participant to other devices of the other participants of the communication session.

17. The computer-implemented method of claim 1, wherein the content is a live audio stream, while in the second operating state, the live audio stream is permitted to be communicated from a device of the at least one participant to other devices of the other participants of the communication session.

* * * * *